Jan. 8, 1963   O. R. TITCHENAL ETAL   3,072,208
VALVE BAG PACKER APPARATUS
Filed Dec. 5, 1960   9 Sheets-Sheet 1
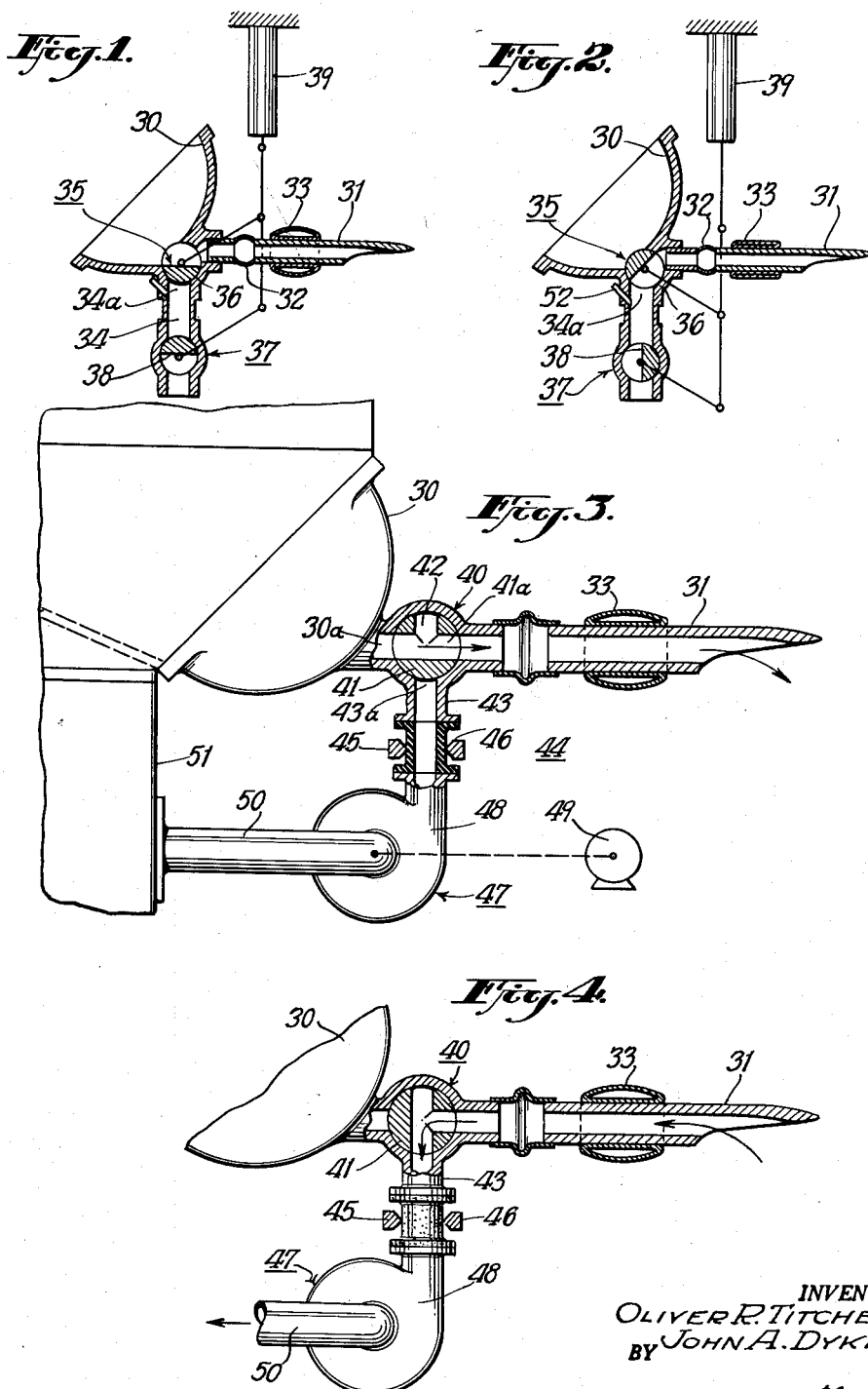
INVENTORS.
OLIVER R. TITCHENAL.
BY JOHN A. DYKER.
Ward, Neal, Haselton, Orme & McClannon
ATTORNEYS.

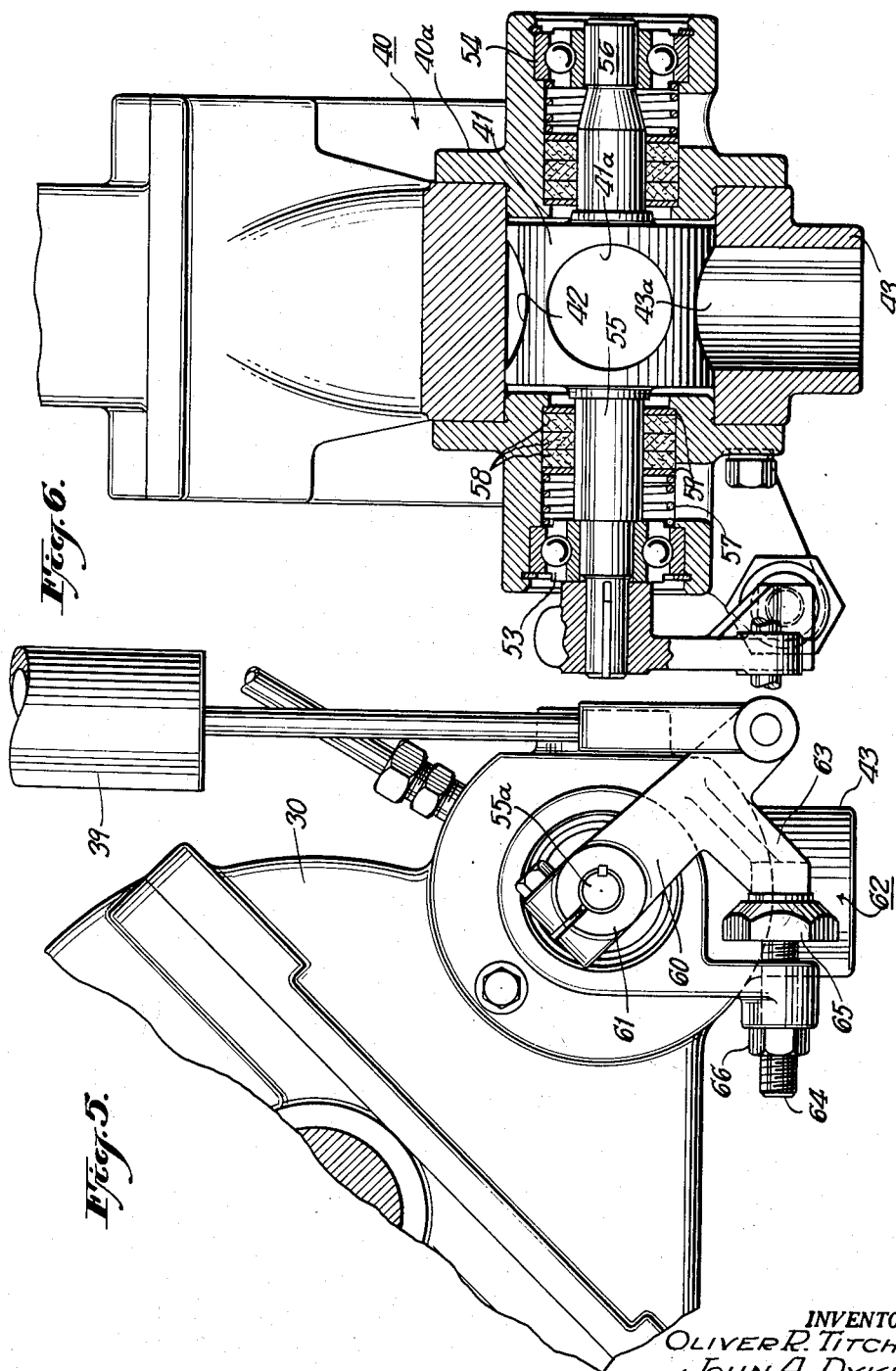

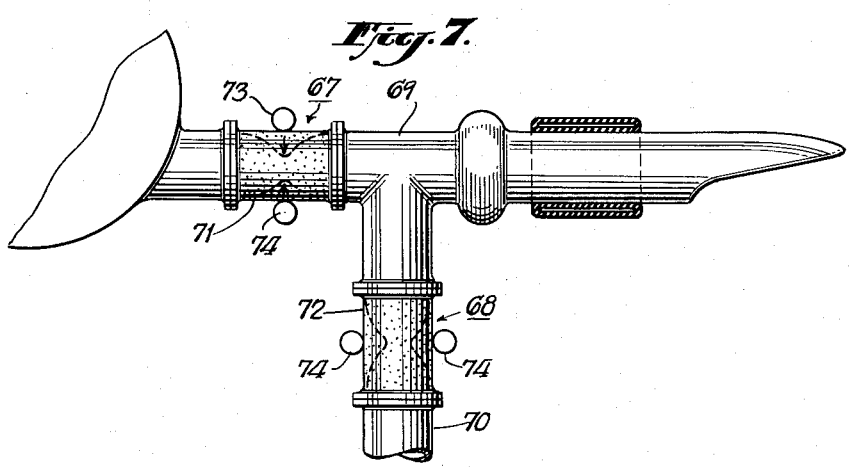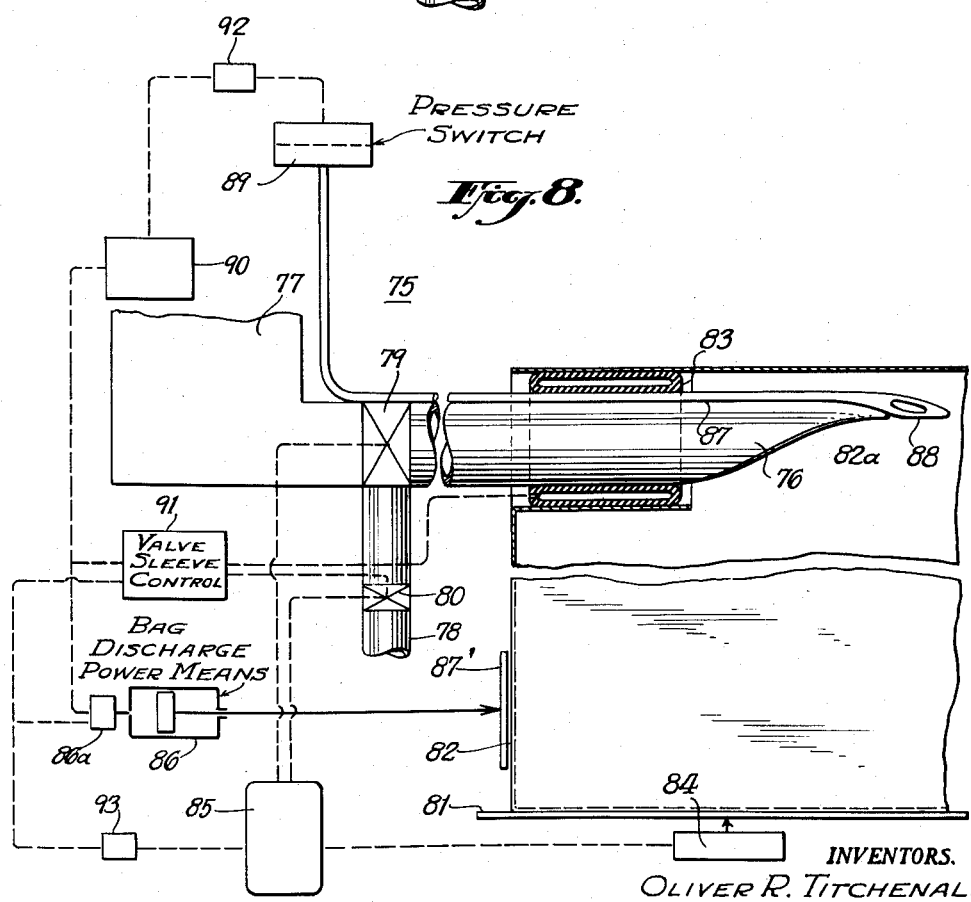

Jan. 8, 1963 O. R. TITCHENAL ETAL 3,072,208
VALVE BAG PACKER APPARATUS
Filed Dec. 5, 1960 9 Sheets-Sheet 4
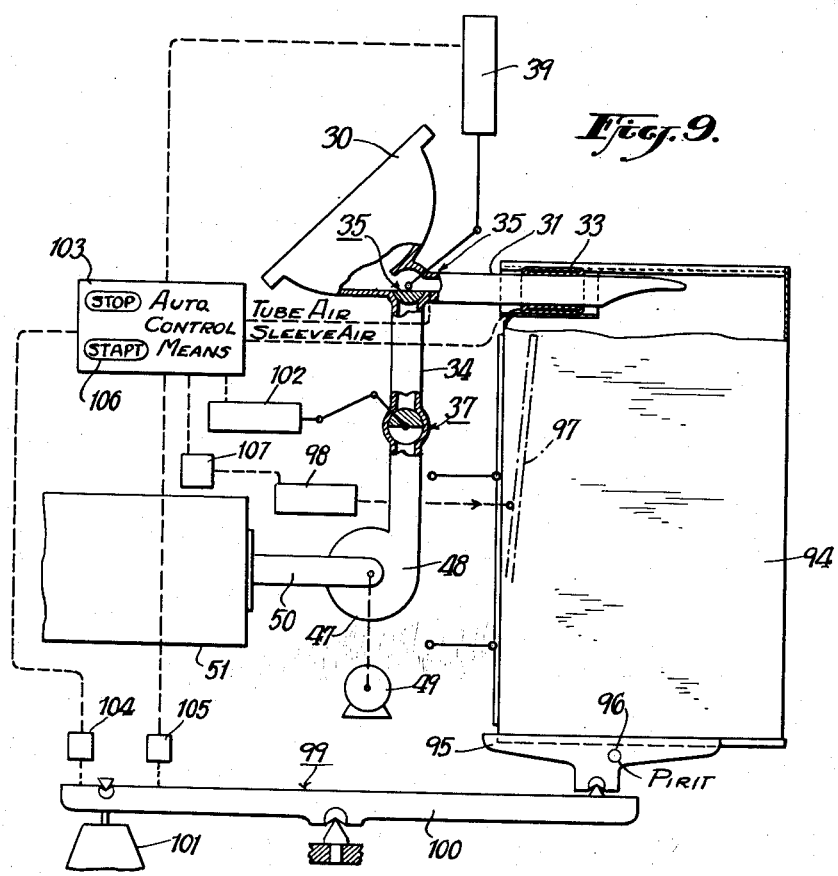
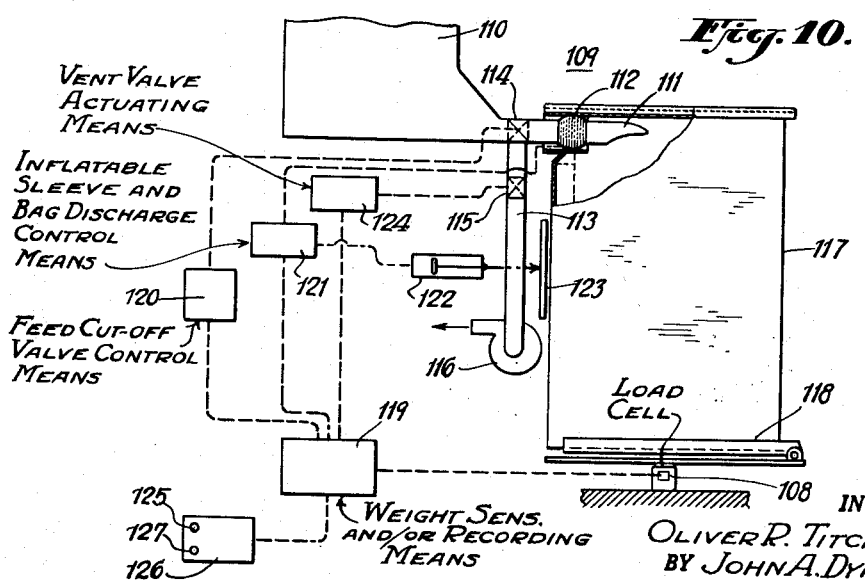
INVENTORS.
OLIVER R. TITCHENAL,
BY JOHN A. DYKER.
ATTORNEYS.

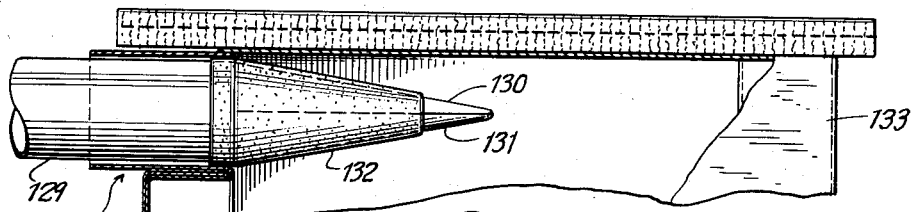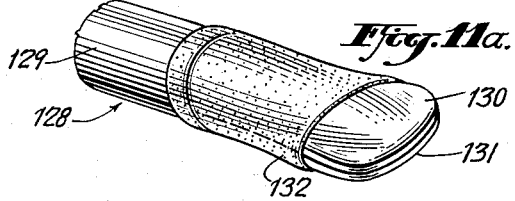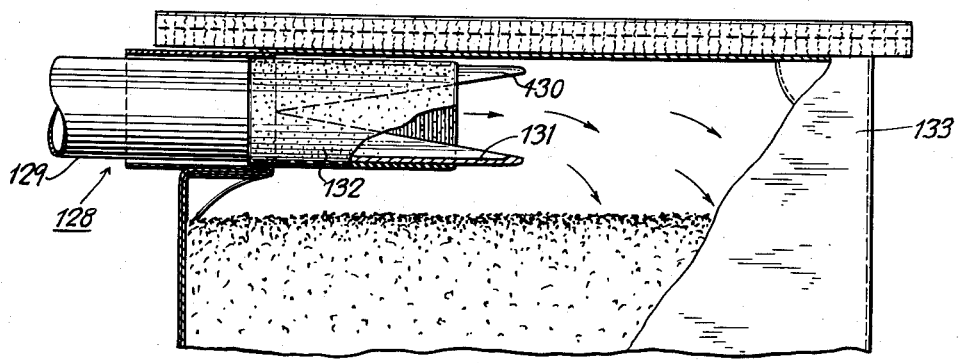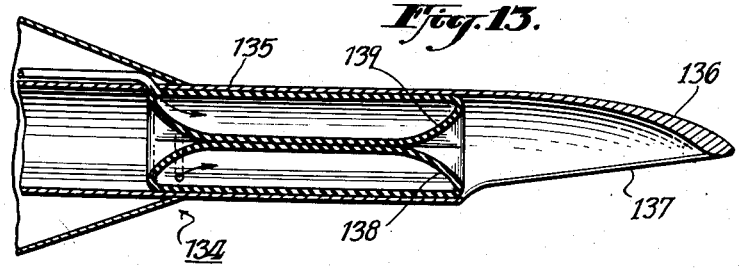

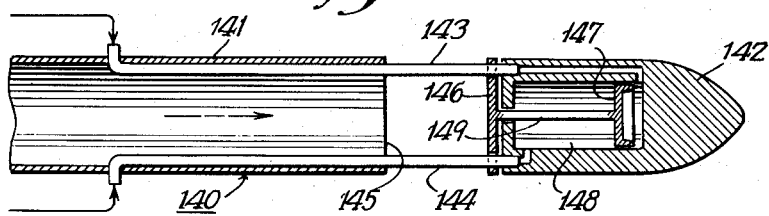
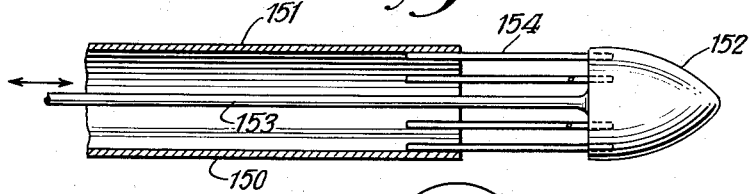
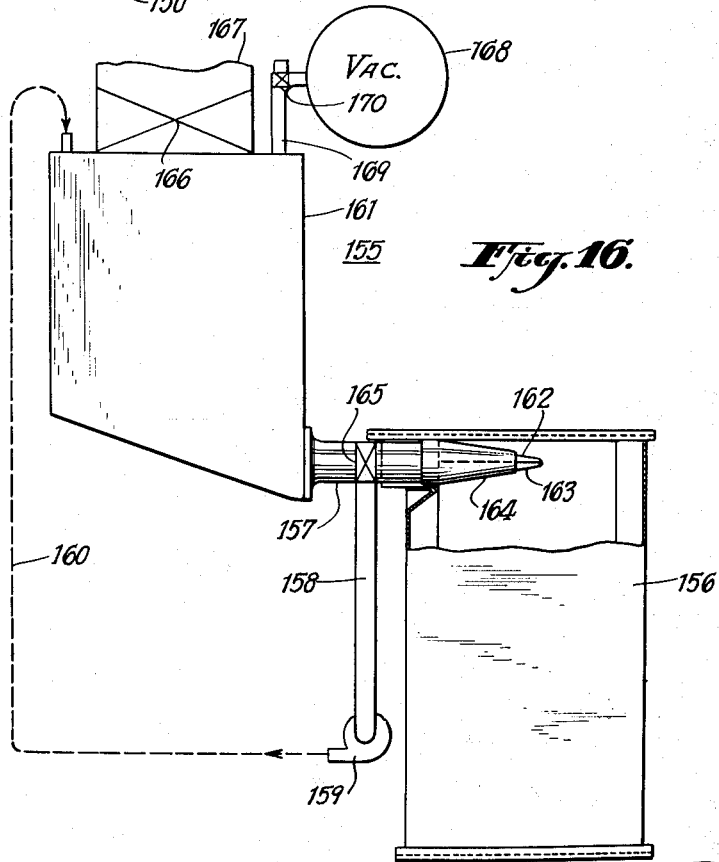

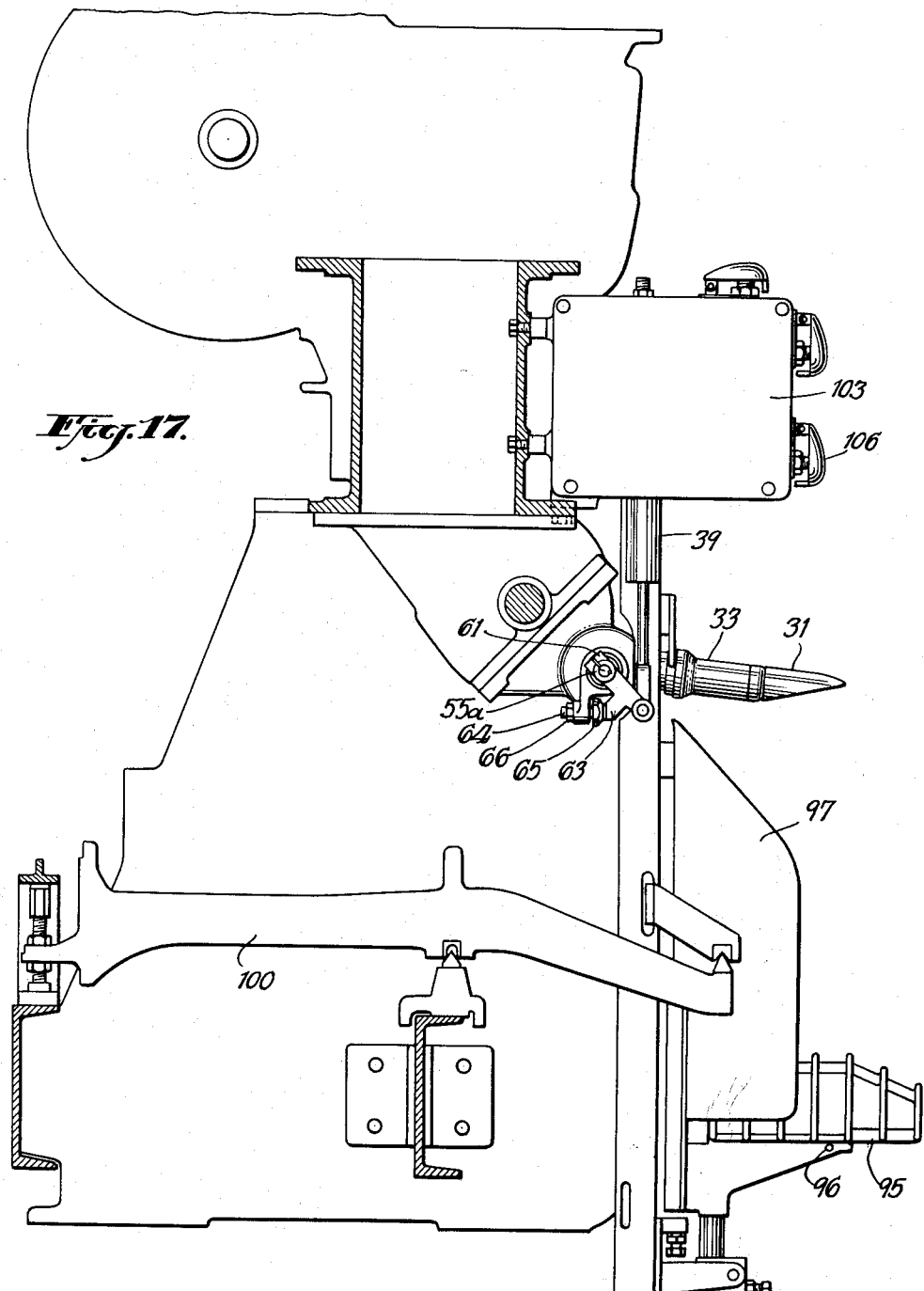

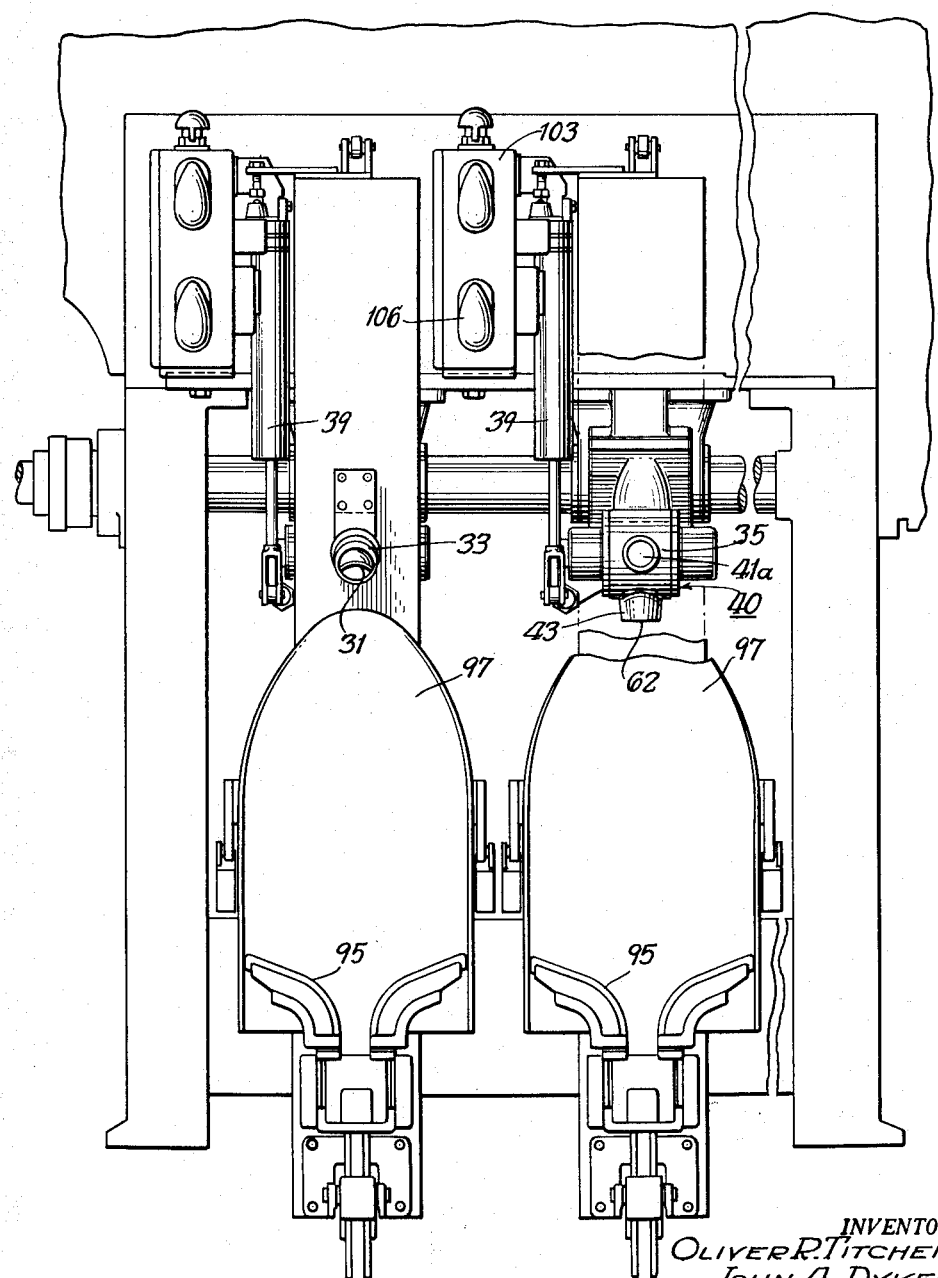

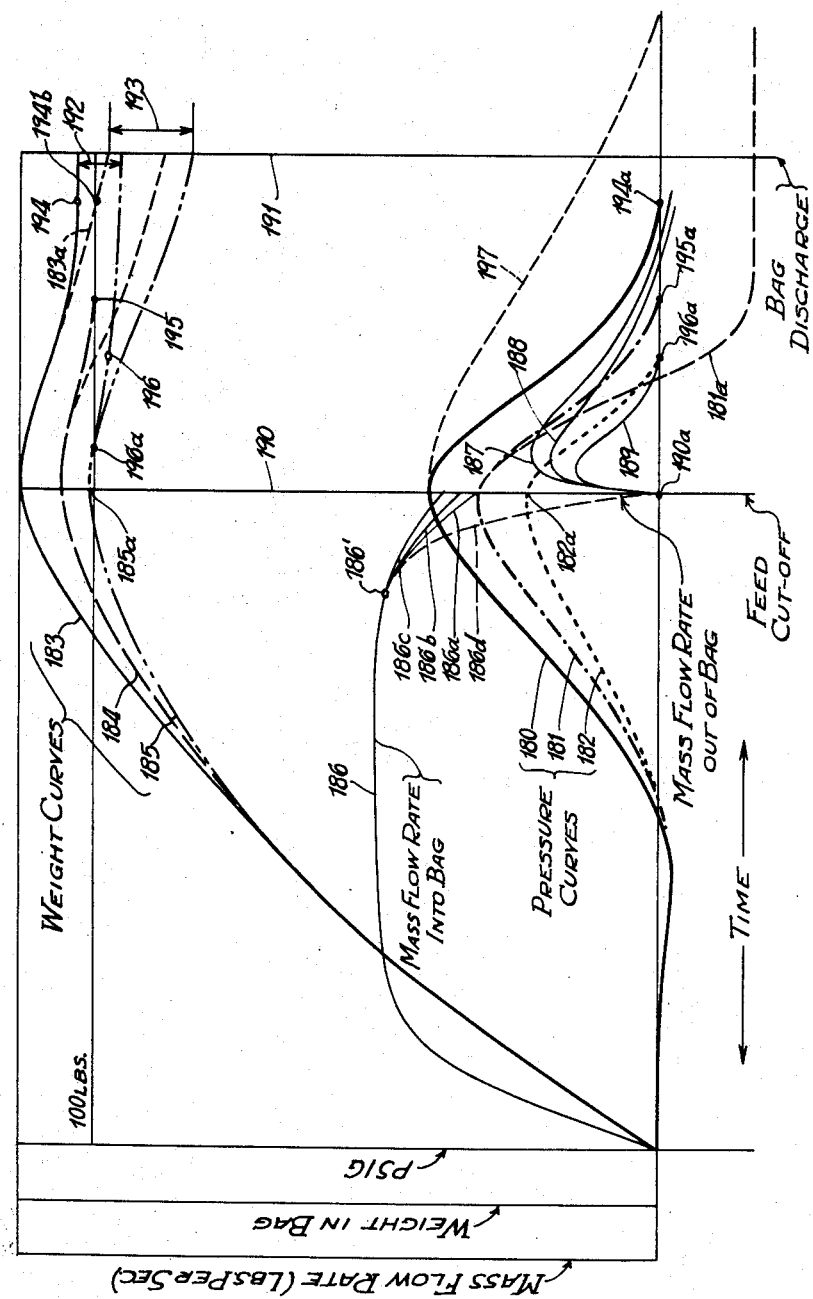

United States Patent Office 3,072,208
Patented Jan. 8, 1963

3,072,208
VALVE BAG PACKER APPARATUS
Oliver R. Titchenal, Rumford, and John A. Dyker, Pawtucket, R.I., assignors to St. Regis Paper Company, New York, N.Y., a corporation of New York
Filed Dec. 5, 1960, Ser. No. 73,721
12 Claims. (Cl. 177—71)

This invention relates to valve bag packers, and more particularly to apparatus for controlling the feed of material from a valve bag packer and the discharge of valve bags therefrom.

Serious problems have existed in connection with prior methods and apparatus for sealing valve bags because of defects in the feed cutoff means and valve bag discharge techniques heretofore employed.

One of the principal objects of the present invention is to provide a novel valve bag filling machine which is capable of discharging a completely clean bag, particularly in the region of the valve thereof.

A further object is to provide a novel valve bag packing apparatus which is capable of discharging a bag with no divided material in the valve region thereof, thus preparing the way for effecting a sound valve closure.

A further object is to provide a novel apparatus for accomplishing the aforementioned objectives in the shortest possible time.

The present apparatus fills a valve bag and discharges same to produce a completely clean valve whereupon it is possible to accomplish a positive and complete valve closure by any one or more of the following:

(a) The sealing of the valve by adhesive or glue placed in it;

(b) Taping over the valve;

(c) By the application of heat-sealable materials which later can be activated.

Other suitable means may be employed for effecting such positive and complete closure of the valve, such as the blowing within the valve of plastic substances which may later be adhered thereby bring together and closing the surfaces of the valve.

Dust or finely divided material of any type will nullify the action of adhesive or glue aforementioned and also the action of any sealing tape employed to close the valve, and also will prevent an effective heat sealing of the valve by fouling or interposing itself between the heat-sealable surfaces.

Accordingly, one of the principal objectives of the present invention is to overcome the above difficulties which have been encountered in the prior art and in methods and apparatus heretofore suggested of this general type and thereby to provide a novel apparatus which will eliminate dust entirely in the valve region of a bag after it has been filled and discharged from the valve bag packer.

The invention, in one aspect thereof, comprises a valve bag packing apparatus embracing a bin for containing divided material, the bin having an outlet in the lower portion thereof and to which there is secured a filling spout for the filling of a valve bag. A venting conduit is in communication with the filling spout preferably adjacent to the outlet of the bin. There is provided a three-way valve for controlling the outlet of the bin into the filling spout and concurrently the venting conduit. Thus such bin outlet and the mouth of the venting conduit are under the influence of such three-way valve which embraces an angularly shiftable valve plug of such valve which in one position closes the vent conduit and opens the bin outlet thereby to permit filling of the bag, and in a second position of the plug closes the bin outlet and opens the vent conduit. The three-way type of valve is employed in order to obtain the largest possible cross-sectional area of a venting conduit to suck out of the bag which has been filled, or nearly filled, any dust in the filling tube area and in the top of the bag. Also, the venting is employed to reduce the pressure of the air within the top of the bag or in the bag as a whole and not necessarily in the top region thereof. Secondary valve means of any suitable variety can be employed for closing the venting conduit by means which are operable separately from those which operate the aforementioned three-way valve and this for the purpose of arresting the action of the venting which may or may not employ suction means thereby to arrest the withdrawal of material from the bag at a preselected weight. In one form of the invention the bag is first filled to overweight and thereafter the venting conduit and suction means employed to suck out of the bag the excess weight thereby to bring it down to the desired target bag weight. The suction can be omitted in another form of the invention. In order to insure that a fluid-tight fit exists between the filling spout and the valve bag, an inflatable sleeve may be employed surrounding the filling spout and suitable means provided for controlling the inflation and deflation of the sleeve in timed relation to the operation of the three-way valve and also the secondary valve for controlling the venting conduit. In this way a blowback around the outside of the filling spout is avoided by virtue of the very tight fit achieved when the inflatable sleeve is inflated. The deflation of the inflatable sleeve may be delayed a preselected time after the cutoff of the feed of material via the three-way valve or deflation of the sleeve may be controlled in timed relation with the closing of the venting conduit, for example, at or after such closing. Furthermore, the discharge of the bag from the valve bag packing machine can be made after a selected delay using any one of the following criteria:

(a) Pressure within the bag;

(b) A selected delay after completion of the bag filling wherein the counting of time commences at the instant of feed cutoff; and (c) The weight of the bag, that is, the weight of the bag is sensed at a selected point whereupon the counting of time for such delay commences.

The above and further objects and novel features of the invention will more clearly appear from the description set forth below when read in connection with the accompanying drawings, the latter being for purposes of illustration only and not defining the limits of the invention, reference for this latter purpose being had to be appended claims.

In the drawings:

FIG. 1 is a schematic view in side elevation, partly in section and with parts broken away, of a feed cutoff valve device employed in a valve bag packer embodying one form of the present invention and shown in connection with a portion of a valve bag packer including a filling spout and a venting conduit therefor;

FIG. 2 is a side elevation, partly in section and with parts broken away, of the same parts shown in FIG. 1 but in a different operating position;

FIG. 3 is a side elevation, partly in section and with parts broken away, of a modification of the form of the invention of FIGS. 1 and 2 and including a three-way valve;

FIG. 4 is a side elevation of some of the parts shown in FIG. 3, certain parts being omitted for clarity, but showing the parts in a different operating position;

FIG. 5 is a side elevation in greater detail of a portion of the invention shown in FIG. 3;

FIG. 6 is a front elevation, partly in section and with parts broken away, of a three-way valve, such as that shown in FIGS. 3, 4 and 5;

FIG. 7 is a side elevation, partly in section and with parts broken away schematically illustrating portions of a valve bag packer, particularly a part of a bin and filling spout to which is connected a venting conduit, both of which have means associated therewith for closing off the filling spout and also the venting conduit, such form comprising a further modification of the form shown in FIGS. 3 and 4;

FIG. 8 is a schematic representation of a valve bag packer having a filling spout and an inflatable sleeve secured thereto and a pressure probe operatively associated with the outermost extremity of such tube, such schematic illustrating certain control means for the inflatable sleeve and its related parts;

FIG. 9 is a schematic representation of a valve bag packer embodying one form of the present invention shown in side elevation, with certain portions in section and parts broken away, and including the feed cutoff device of FIGS. 1 and 2 in combination with certain control elements;

FIG. 10 is a schematic representation of a valve bag packer embodying another form of the invention;

FIG. 11 is a fragmentary side elevation of a portion of a filling spout embodying a duck bill having surrounding it an elastic sleeve, such duck bill being shown inserted within the valve of a valve bag;

FIG. 11a is a perspective view of the duck-bill shaped filling spout of FIG. 11;

FIG. 12 is a side elevation of the parts shown in FIG. 11 but with the duck bill filling spout in an open condition and with the valve bag thereon partially filled;

FIG. 13 is a side elevation, partly in section and with parts broken away, of a modification of a filling tube having inflatable bladders therein for shutting off the feed of material to a valve bag;

FIG. 14 is a side elevation of a further form of a valve bag filling spout comprising a portion of this invention;

FIG. 15 is a side elevation of still another form of a valve bag filling spout comprising a portion of the invention;

FIG. 16 is a side elevation schematically representing a valve bag filling machine of the fluidizing type and employing a filling spout having connected thereto a venting conduit and illustrating novel means for controlling the flow of feed to a valve bag on the filling spout;

FIG. 17 is a side elevation of one form of a valve bag packer embodying a cutoff valve, such as that shown in FIGS. 3 and 4;

FIG. 18 is a front elevation of such packer showing a two tube type of machine embodying the present invention; and FIG. 19 is a graphical representation showing certain changes of weight of material in the bag, of pressure within the bag, and in mass flow rate of material into and out of the bag during the time of bag filling and up to the time of bag discharge.

Referring now to FIGS. 1 and 2, the first form of the cutoff valve comprising a portion of the present invention will now be described. The cutoff valve is designed for use with a valve bag packing apparatus having a bin, a portion of which is shown at 30 and which may contain divided material which is to be filled into a valve bag having a valve designed to fit over a bag filling spout 31. A portion of the filling spout 31 comprises a resilient sleeve-like connection 32 which permits the outer end of the filling spout 31 to move vertically to accommodate the weighing movement of the bag with respect to those types of bag packers where this is required. Sleeve 32 may be of rubber or other suitable elastic material.

If desired, an inflatable sleeve 33 is provided which surrounds the filling spout and is operatively connected to suitable means for inflating and deflating same and thereby to coact with the inner surfaces of the valve of the valve bag fitting over the spout. The sleeve may be inflated as schematically shown in FIG. 1 or deflated as in FIG. 2.

A venting conduit 34 is provided which is connected to the apparatus as follows: The venting conduit 34 has a mouth 34a which is in communication with the aforementioned filling spout adjacent to the outlet of the bin 30, this being considered a part of the filling spout. The mouth of such venting conduit is under the influence of a primary valve 35 which is provided with an angularly shiftable primary valve plug 36 comprising a portion of the valve. The outlet of the bin 30 is thus closable and the mouth of a venting conduit is openable by such primary valve plug in its first position as shown in FIG. 1. Also, the mouth of the venting conduit is closable and the bin outlet openable in response to such valve plug 36 being shifted to its second position as shown in FIG. 2.

The form of the invention shown in FIGS. 1 and 2 is of the double valve type wherein in addition to the aforementioned primary valve a secondary valve is provided for controlling the flow of material and fluid through the venting conduit 34. Consequently, a secondary valve designated 37 is provided having an angularly shiftable valve plug 38 which in the first position of FIG. 1 closes the venting conduit 34. But in its second position, as shown in FIG. 2, the venting conduit is opened.

In one form of the invention, namely, that shown in FIGS. 1 and 2, both the primary and secondary valve plugs are operatively interconnected for concurrent angular movement under the influence of any suitable power means, such as a fluid-actuated power cylinder 39 having therein a piston which is operatively connected to the valve plugs 36 and 38 by a linkage as schematically indicated in FIGS. 1 and 2.

The power means, such as the cylinder 39 in the position of FIG. 1, namely, the bag filling position, opens the filling spout 31 and closes the venting tube 34. Thus the primary valve plug 36 is positioned for permitting the flow of material into the bag and the secondary valve plug 38 for closing the venting tube, as in FIG. 1.

Alternatively, such means can shut off the feed and open the venting tube so that the valve plugs assume the position of FIG. 2, as aforementioned, whereby the interior of the bag is in communication with the venting conduit 34 and, if desired, with suitable suction means which may assist in merely reducing the pressure within the valve or, as will be more fully discussed below, removing some of the material from the bag so as to reduce its weight (vent back to target weight from an overweight condition).

Note that, in the form of the invention of FIGS. 1 and 2, operative interconnection between the primary and secondary valve plugs is fixed so that they cannot operate independently but operate concurrently. If, however, it is desired to shut off or close the venting tube while the primary plug 36 is in a closed position, it is necessary independently to operate the secondary valve plug 38 and this will become necessary in the event that it is desired to shut off the venting when a preselected weight of material has been reached while removing material from the bag as aforementioned. This will be discussed more fully hereinafter.

Referring to the form of the invention of FIGS. 3 and 4, there is shown a modification of the form shown in FIGS. 1 and 2 wherein there is employed in lieu of the primary and secondary plugs of FIGS. 1 and 2, a three-way valve 40 having single valve plug 41 which is designed for angular movement within a cylindrical housing, as shown, and through which there is provided a passage 41a extending therethrough so that material can pass from the bin 30 directly into the filling spout 31 of FIG. 3. Said plug 41 is also provided with a partial passage 42 therethrough so that when the plug 41 is shifted in position from that of FIG. 3 to that of FIG. 4 the feed will be cut off from the bin 30 and the bag will be permitted to vent via a venting conduit 43 which is analogous to conduit 34 of FIGS. 1 and 2. However, the venting conduit of FIG. 3 is provided with a different type of cutoff valve, in this form a pinch type, embracing a compressible or collapsible tube 44 which can be pinched shut by a pair of bars 45, 46.

In lieu of the type of filling spout and inflatable sleeve employed with the feed cutoff and venting arrangement of FIGS. 1–6, it is possible to employ a duck bill type of filling spout as shown in FIGS. 11, 11a and 12 consisting of a pair of duck bills which are surrounded by an elastic or resilient sleeve and which can be expanded to obtain a tight grip within the valve bag as will be explained more fully hereinafter.

The feed cutoff and inflatable sleeve type of device of FIGS. 1–6 eliminates the dust normally produced by prior art types of feed cutoff, such as the slide type having a partition which moves linearly to open or close the filling tube or a portion of it adjacent to the valve bag packer bin.

In operation of the embodiment of FIGS. 1–6, the operator places an empty bag on the filling tube or spout and starts the filling operation in the usual way by pressing a starter button on the packer machine. This actuates the cylinder 39 or other power means and also opens the theretofore closed feed valve 35. At the same time the rubber sleeve 33 surrounding the filling tube is inflated thereby firmly holding the bag on the tube. When the scale (not shown) supporting the bag responds to a selected weight of material in the bag, it automatically actuates a stopping means (not shown) and may press a suitable stop button which again actuates the power device 39 to close the cutoff valve 35 and deflate the sleeve 33. At this time the bag is permitted to vent back through the filling tube via the venting conduit 34 and following such venting the operator deflates sleeve 33, discharges the bag and repeats the cycle. However, if desired the deflation of the sleeve 33 may be delayed for a selected period after such shutting off of the feed via the closing of the valve 35 to insure the prevention of a blow-back of dust laden material around the outside of the filling spout.

A suction can be applied to the venting conduit thereby speeding the venting of the bag. Also, if desired, a small air jet can be directed into the filling tube for the purpose of blowing out material which has become plugged therein and this can be initiated by the starting button.

In FIG. 3, a suction means generally designated 47 is employed which is connected to the lower extremity of the venting conduit 43, such suction means in this form comprising an air or blower type pump 48 driven by an electric motor 49. The pump 48 via a conduit 50 directs its exhaust into a suitable container, such as a bin 51 from which collected material can be conveyed to the main bin 30.

Any other suitable suction means can be connected to the extremity of the venting conduit 34 of FIGS. 1 and 2.

In the forms of the invention of FIGS. 1–4, inclusive, there is the possibility that finely divided material, even when the primary valve 35 or 40 is in the position shown in FIGS. 1 and 3, may seep between the primary and secondary valves during the filling operation so that when the secondary or lowermost valve, as viewed in these figures, is opened, the material may not move because of a plugged condition. In order to overcome this, a continuous air supply or air leak or a suitable small air jet can be directed into the space between the valves. An example of a conduit for accomplishing this is schematically shown in FIG. 2 at 52, such conduit entering the aforementioned space between the two valves in the upper region thereof and being directed downwardly. This conduit can be connected to a suitable source of air under pressure.

The bin portion 30, as shown in FIGS. 1–4, inclusive, comprises a segment of a circle which is adapted for receiving a rotary impeller for forcing the material through the filling spout. However, the invention is not limited to a bin portion of this type nor is it limited to such a power driven impeller, it being possible to employ the apparatus as shown in these figures with a fluidizing type of packer or any other suitable type of packer.

Referring now to FIGS. 5 and 6, there will be described in further detail a three-way type of primary valve which has been set forth above in connection with FIGS. 3 and 4. This three-way valve is generally designated 40 (FIGS. 3 and 6) and the valve plug thereof is designated 41, the passages thereof being further designated 41a and 42 as before (FIGS. 3 and 6).

The valve plug 41 is mounted concentric with suitable bearings therefor which, in the form shown in FIG. 6, are situated on either side thereof designated at 53 and 54 for supporting the outer extremities of trunnions 55 and 56 which support the plug 41 in the manner shown in FIG. 6. The trunnions 55 and 56 are coaxial and are central with respect to the valve plug 41 which is of generally cylindrical conformation though pierced by the passages 41a and 42 aforementioned. The location of the plug 41 so that it is concentric with the bearings enables the plug to seal both the outlet port 30a (FIG. 3) from the bin 30 and the port or mouth 43a of the venting conduit 43 (FIG. 3) and without plugging.

It has been found that a desirable clearance between the rotor or plug 41 and the interior surface of the valve housing therefor should be approximately 0.006 inch. This has been found to be advantageous in order to inhibit sticking of the rotor or prevention of its angular shifting as a result of expansion of the metal thereof when the divided material being packed reaches a high temperature which may sometimes go to 280° F.

Note that the bearings 53 and 54 are in effect outside of housing 40a for the valve 40, that is, they are remotely situated with respect to the angularly shiftable valve plug 41.

Also, there are suitable packing or gland devices interposed between the bearings 53 and 54 and the valve plug 41, that is, one gland on each side of the plug, the lefthand one of which includes a spring 57 which is interposed between the inner surface of the bearing 53 and annular washers or packing discs 58. The righthand gland is similar. Preferably on opposite extremities of the packing discs 58, which in this form are three in number, there are metal protective washers 59. The innermost of such washers 59 is held in spaced relation to the valve plug 41 by means of a suitable shoulder arrangement as well shown in FIG. 6. The squeezing pressure placed upon the packing discs 58 insures suitable sealing of the valve plug and prevention of the sifting of finely divided material therepast which might otherwise foul the bearings 53 and 54.

Reverting to FIG. 5, it will be noted that the power cylinder 39 is operatively connected to the valve plug 41 by means of a lever 60 which, by means of a collar 61, embraces extremity 55a of the trunnion 55. One limit of the angular motion of the plug 41 is adjustable by means of a limit-stop device 62 embracing a finger 63 rigidly secured to the lever 60 which coacts with a fixed but adjustable bolt 64 having a head 65, there being a suitable lock nut 66 for securing the adjustment.

Further regarding the form of the invention of FIGS. 3–6, inclusive, it will be noted that in the form of FIGS. 3 and 4 two cutoff valves are shown, namely, a primary valve for controlling the flow of material from the bin into the bag via the spout and bearing the number 40, and in addition the vent conduit valve 44. However, in the form of FIGS. 5 and 6 the latter valve 44 is omitted and for purposes of illustrating the fact that in one form of the invention no venting valve is employed. Thus in this latter form of the invention no reliance is placed upon a vent conduit valve, such as 44, and sole reliance is placed upon the valve 40 and this form of the invention may be with or without a suction device, such as 47.

However, in those forms of the invention where the bag is filled to overweight and thereafter so-called "back weighing" is employed, the secondary valve 44 or one performing its function is essential. Thus, for example, if it is desired ultimately to fill the bag to a target weight of 100 pounds, and the back weighing technique is employed, there will be filled into the bag say 105 pounds and 5 pounds will be removed via the venting conduit when the rotary valve 40 is in the position shown in FIG. 4. The second valve 44, or one performing its function, is essential thus in this latter form of the invention employing back weighing because when the correct weight has been reached, the venting conduit must be shut off.

However, in still a further form of the invention (not shown) it is possible to employ the aforementioned back weighing technique and still to eliminate the vent conduit valve 44 in the vent conduit per se and in lieu thereof to design the rotary valve 40 in such a way that it will perform the function not only of shutting off the feed when desired in one angular position but also in a second angular position perform the function of shutting off the venting conduit so that both the feed to the bag and the venting conduit are concurrently shut. Thus if such a single shiftable valve body is employed, in its first position the bag can be filled therethrough as aforementioned, in its second position the bag filling can be shut off, and in a third position both the bin and the venting conduit are shut off both by this one angularly shiftable valve body. The latter body can be linearly instead of angularly shiftable.

Referring to FIG. 7, there may be employed in lieu of the valve combinations of FIGS. 1–6 two shutoff devices 67 and 68 respectively interposed in a filling tube 69 and a venting conduit 70, such shutoff devices being analogous to the pinch type of valve 44 described above in connection with FIGS. 3 and 4. Thus each of such pinch type valves embraces a resilient or collapsible tube respectively at 71 and 72, each of which are respectively pinchable to a closed condition by pairs of bars 73, 73 and 74, 74.

The secondary valve 68 in the venting conduit 70 may be positioned above the location shown in FIG. 7 so that it is directly adjacent the filling tube 69 thereby to inhibit a plugging of that section of the venting conduit between the interconnection point of the filling tube and the venting conduit.

In a further modification or form of the invention, we have combined the double valve cutoff, such as that shown in FIGS. 1 and 2, with a valve bag filling and weighing machine employing a delayed bag discharge device. By such device there can be effected a delayed bag discharge employing not time as the criterion for determining the end of the delay period, but some other parameter, such as pressure, particularly the pressure within the bag. However, time can be so employed in one form of the invention as will be set forth more fully hereinafter.

Referring to FIG. 8, there is shown an apparatus for accomplishing the objectives of the last paragraph. In this figure there is shown a valve bag packing and weighing device.

The filling and weighing machine of FIG. 8 embraces a valve bag packer generally designated by the number 75 which includes a filling spout 76 in communication with a bin 77. The packer can be of the fluidizing type or a non-fluidizing type, for example, having an impeller. The filling tube 76 is in communication with a venting conduit 78 analogous to venting conduits 34 and 43 of FIGS. 1 and 3 above described. Also interposed in the filling tube 76 and the venting conduit 78 are cutoff valves which may be of any suitable type such as those heretofore described, these valves being designated respectively 79 for the filling tube and 80 for the venting conduit. These valves are schematically indicated in FIG. 8 to represent the versatility thereof, that is, that they may be of any desired type, such as the rotary type of FIGS. 1 and 2 or the types of FIGS. 3 and 7.

The venting conduit 78 may be connected to a suction device such as that described in connection with FIG. 3.

Also, the filling and weighing machine 75 embraces a bag chair 81 for supporting a valve bag 82 thereupon, into the valve of which there is inserted as shown the filling spout 76. The latter is provided with some suitable means for holding the valve bag upon the filling spout and in this instance an inflatable sleeve 83 which operates as above described.

Weight sensitive means or weighing means 84 are provided for supporting the bag chair 81 and weighing the bag 82 and its contents in any suitable manner. For example, the weighing means 84 may include a scale beam or a weighing device of the leaf spring variety or it may employ a resistance type strain gauge.

The weighing means 84 is operatively connected to a control means 85 (sequence control device) for the cutoff valve 79 and 80. Thus, as shown, the control device 85, by its separate operative interconnections to the valves 79 and 80, can separately control same for the purpose of governing a back venting of the bag 82 after it has been filled to a selected weight whether or not there is also a back weighing from this bag via the venting conduit 78, i.e. weight removal (via conduit 78) from an overweight bag. This will be described more fully hereinafter.

In the form of the invention of FIG. 8, the discharge of the bag 82 from the bag chair 81 is accomplished after a delay which employs the pressure within the bag as the criterion. The actual discharge device as shown comprises a power cylinder 86 which is operatively connected to a portion of the bag chair 87' for tilting same and thrusting the bag therefrom.

The bag discharge power means in turn is actuated in response to the pressure in the region 82a in the top of the bag, or alternatively in response to the pressure within the bag without being restricted to a given region, under the following circumstances:

A conduit 87 is provided which extends along the filling spout 76 up to the extremity thereof, and terminates in the pressure probe 88 which is in communication with the upper region 82a of the bag and thus can sense the pressure therein. The conduit 87 in turn is in communication with a pressure-sensitive switch 89 which is operatively connected to a control element 90 for the bag discharge power means 86. The control element 90, if desired, also can be operatively connected to a venting valve control element 91 and may operate in a manner set forth below.

The conduit 87 need not be necessarily in communication with the tip of the filling tube but in some manner should be in communication with the interior of the bag.

In operation, the weighing means 84 (FIG. 8) senses a preselected weight of material in the bag and actuates the control means 85 which in turn shuts off the feed to the bag by closing the filling tube valve 79 and concurrently opening the venting conduit 78 by opening valve 80, whereupon back venting of the bag can take place with or without suction. At this time the inflatable sleeve 83 is inflated holding the bag firmly upon the filling spout 76.

When the pressure in the bag 82 has fallen, for example from 32 to 16 inches of water, the pressure switch 89 is actuated thereby in turn to actuate the control element 90 which sets in motion the bag discharge means 86 to eject the bag from the bag chair concurrently with the deflation of the inflatable sleeve 80 via valve and sleeve control element 91 which is operatively connected to the inflatable sleeve.

If desired, any suitable pressure norm may be employed for triggering or actuating such discharge means for the bag.

Prior to such bag discharge, the aforementioned back venting takes place via the venting conduit 78 and, if desired, back weighing may take place, that is, the bag 82 may be filled to overweight, for example, to 105 pounds of divided material and 5 pounds may be sucked out of the bag via the conduit 78 to reach a target weight of 100 pounds. Back venting alone may not remove any or only negligible material from the bag.

If desired, the weight responsive control device 85 can be operatively connected directly to the valve and sleeve control element 91, and also to the bag discharge power means 86, as shown in FIG. 8, thereby to actuate same in lieu of actuation by the pressure responsive control element 90 above described. Accordingly, a switch 92 is interposed in the operative interconnection between the pressure switch 89 and the control element 90 for disconnecting the latter when these parts are to be inactivated in favor of the control means 85.

Thus when the switch 92 is actuated to disconnect the pressure switch 89 from the control element 90, and a switch 93 actuated to bring about the operative interconnection of the weight responsive control means 85 and said valve and sleeve control element 91 and also the bag discharge power means 86, as the norm for controlling the delay in discharge of the bag, there is employed in one form of the invention a time interval which is measured commencing with feed cutoff by the primary valve 79 in the filling spout 76, or commencing with the closing of the valve 80 in the venting conduit 78. This is accomplished by means of an adjustable timer 86a.

Alternatively, it is possible, by means of the embodiment of FIG. 8, to render inoperative the secondary or venting conduit valve 80 and to discharge the valve bag on the filling machine either in response to the pressure switch 89 sensing a selected pressure in the bag, or by the weight responsive control element 85.

The inflatable sleeve 83 of the embodiment of FIG. 8 is not an essential element of this form of the invention but is advantageous in that it provides a good seal between the filling spout and the interior of the sleeve, usually even if the operator of the machine puts the bag on the spout improperly. In the absence of the inflatable sleeve a seal between the valve of the valve bag and the filling tube can be accomplished by means of a duck bill filling spout of the character of FIGS. 11, 11a and 12 to be set forth more fully hereinafter.

Thus in the embodiment of FIG. 8 there can be an overfilling of the valve bag, that is, over the target weight, for example, as aforementioned if the target weight is 100 pounds, there may be filled into the bag 105 pounds of material and 5 pounds may be removed therefrom via the venting conduit 78 with or without the aid of suction. The employment of the secondary valve 80 is important in this form of back weighing apparatus because it provides a separate means for shutting off the venting conduit when such target weight is finally reached.

In view of the fact that the back weighing above described can be accomplished by this form of the invention merely by venting with suction and also by venting without suction, the aforementioned two valves 79 and 80, regardless of their character, are necessary in one form of the invention and when such back weighing via the venting tube is employed, either with or without suction, it is necessary to close the venting valve in the venting conduit when the target weight has been reached and this is the reason, of course, why the second valve must be separately closable with respect to the feed cutoff valve 79.

Note that the delaying of the discharge of the valve bag in the embodiment of FIG. 8 can be accomplished as aforementioned by employing a selected pressure within the bag as the criteria and not by counting time commencing, for example, with the instant of feed shutoff or with the instant of achieving a preselected weight of the bag and contents. Also the deflation of the sleeve 84 or alternatively the closing of a duck bill filling spout as in FIG. 11a (to be described hereinafter) can be not only in accordance with time or pressure but in accordance with any other variable parameter which is pertinent to the bag filling cycle. Thus the delay in the deflation of the sleeve can be: (a) in response to the achieving of a selected pressure within the bag or, (b) in response to a time delay following sensing a selected weight on the weighing means 84, or (c) in response to a selected time delay commencing with the instant of the shutting off of the valve 79, or (d) deflation with no delay can occur concurrently with the closing of the venting valve 80 (FIG. 8).

Referring further to the embodiment of FIG. 8 and the control means 85 which governs the valves 79 and 80 during the venting back to weight from an overweight condition, such control means 85 employs means for shutting off the main valve 79 when the overweight condition is reached, and secondly, such control means 85 employs and performs the function of shutting off the vent valve 80 when the lower weight is reached, for example, 100 pounds, and these two sensing means are coordinated so that the proper sequence of valve closures occurs. Assume, for example, that the control means 85 embraces two switches which act in cooperation with the weighing means 84, thus a first switch has the function of shutting off the valve 79 and the feed of the material to the bag when the overweight condition is reached, such as the aforementioned 105 pounds, and a second switch has the function of shutting off the valve 80 when the target weight, such as 100 pounds, is reached and these two switches are coordinated so that when one is operative the other is inoperative.

Referring now to the form of the invention shown in FIG. 9, it will be seen that the cutoff valves respectively for the filling tube and the vent conduit are identical to those shown in FIGS. 1 and 2 with the exception that there is no common operative interconnection between the two valves by means of a common linkage as shown in FIGS. 1 and 2, these two valves being separately controlled.

Thus in the embodiment of FIG. 9, a primary valve 35 is employed identical to that of FIG. 1 and a secondary valve 37 is employed also identical to that of the latter figure. The filling spout 31 and the inflatable tube 33 of FIG. 9 are also similar to those of FIG. 1.

In FIG. 9 a valve bag 94 is inserted upon the filling spout 31 in a conventional manner with the bottom thereof resting upon a bag chair 95 pivoted at 96 for the purpose of ejecting the bag by means of pressure acting upon a back plate 97 of the bag chair which in turn is operatively connected to a power cylinder 98 as will be discussed below.

The bag chair 95 is supported upon weighing means broadly designated 99 which, in the form shown in FIG. 9, comprise a scale arrangement having a scale beam 100 which, near one extremity, supports the aforementioned bag chair, and at the other extremity supports a counterweight 101.

The two valves 35 and 37 of FIG. 9 are respectively under the influence of the power means 39 similar to that of FIGS. 1 and 2 and power means 102. Furthermore, these power means which are, for example, pneumatic power cylinders, are in turn under the influence of an automatic control device or means 103 which controls the sequence of operation of the various elements connected thereto, including the aforementioned power means 39 and 102 and also the power cylinder 98 for ejecting the bag. In addition, the automatic control means 103 governs the flow of air to the inflatable sleeve 33 and to the housing of the valve 35 for aiding in preventing a plugging thereof by the divided material.

The automatic control means 103 is operatively associated with the weighing means 99, in the form shown, by means of a pair of switches 104 and 105 which are employed in influencing means 103 when the aforementioned technique is employed of venting the bag back to weight from an overweight condition.

Thus in operation of the embodiment of FIG. 9, the working of the apparatus is initiated by the operator's pressing a starter button 106 on the automatic control means 103 which has the effect of opening the primary valve 35 via the power means 39 and simultaneously of closing the secondary valve 37 via the power means 102, thereby causing divided material to flow from the packer (which may be of the fluidizing or any other type), it being understood that simultaneous with the starting of the flow of material through the filling spout into the bag, the inflatable sleeve 33 is inflated or a clamp is actuated in time firmly to hold the valve bag on the filling spout. Thus divided material is filled into a bag until a selected overweight condition is reached, for example, 110 pounds, and the weighing means 99 undergoes weighing motion, thereby to actuate the first switch 104 which, via its operative interconnection to the automatic control means 103, causes the primary cutoff valve 35 to be closed, thereby shutting off the feed of material and opening the mouth of the venting conduit 34. Concurrently the automatic control means opens the secondary or vent valve 37, thereby permitting a venting back from the top bag 94, this venting back being preferably with suction caused by the motor-driven pump 48 and thus removing a selected amount of material from the top of the bag. When the target weight, for example, 100 pounds, is reached after removing 10 pounds of material from the bag, the second switch 105 is actuated by weighing movement of the scale beam 100 and this in turn, via the automatic control means 103, actuates the power means 102 and shuts off the secondary or vent valve 37 whereupon the automatic control means 103 can actuate concurrently with the closing of the valve 37, the power means 98 for ejecting the bag 94 from the chair 95. In view of the venting back to target weight by means of this technique, the pressure within the bag 94 will be substantially reduced and may be at a desired value at the time of discharge of the bag. However, if desired, a delay in the discharge of the bag following the closing of the valve 37 may be interposed by means of a timer device 107 which is interposed in the operative interconnection between the automatic control means 103 and the power means 98. The timer 107 may be adjustable to a selected time interval, for example, 1 to 5 seconds, thereby to eject or discharge the bag from the packing machine a selected interval after the closure of the vent valve 37. Alternatively, as aforementioned, the timer 107 may be dispensed with in one form of the invention.

Note, however, that the first switch 104 has the function of shutting off the feed of material to the bag by closing the primary valve 35 when the overweight condition is reached. Also, the second switch 105 performs the function of shutting off the vent valve 37 when the target weight, such as 100 pounds, is reached and the two switches 104 and 105 are coordinated so that when one is operative the other is inoperative. Thus in this form of the invention as well as in the form of FIG. 8, there are employed means for sensing the existence of the overweight condition, such as 110 pounds, means for sensing the target weight, such as 100 pounds, the first sensing means acting to shut off the feed and such second sensing means acting to shut off the vent valve. Also suitable means are employed to insure that the vent valve is not shut off when the overweight is reached and conversely to insure that when the target weight is reached during an increase of the weight on the bag chair, the vent valve 37 is not actuated.

The amount of material entering the bag 94 can be predetermined by a setting of the scale beam weights 101. When this predetermined amount of material has entered the bag, the flow of incoming material is cut off as aforementioned and the bag is caused to vent, that is, the excess air in the bag escapes through such valve and conduit construction. The escaping air takes with it a certain amount of material and this amount of material varies with the density, that is, the void ratio of the material in the bag. Thus the final weight of the filled bag depends on the amount of material escaping therefrom.

In the vent-to-weigh system the bag is normally filled to slightly more than the desired weight whereupon the bag is vented by means of the suction system and the suction is shut off when the desired final weight is reached. As the bag is discharged, the suction may be momentarily recreated for the purpose of cleaning the valve of the valve bag as the end of the filling tube passes over and removes material from the valve area.

The type of rotary cutoff valve of FIGS. 1–6 is advantageous in that it can in one motion cut off the flow of material to the bag and open a passage from the bag to a suction or to a venting conduit.

It has been determined in one type of apparatus, such as that shown in FIGS. 8 and 9, that in venting the bag from an overweight condition it is possible to remove about 5 pounds often without suction. However, in order to remove any more with the dimensions of this particular equipment, for example, 10 pounds, it is necessary to employ suction.

Referring to the embodiments of FIGS. 8 and 9, there has been shown broadly a weighing means 84 in FIG. 8 and this has been described as a weighing device of any suitable type whereas in the embodiment of FIG. 9 a scale beam type of weighing means is employed. The weighing means 84 of the conitnuous weigh type is considerably more rapid than the scale beam type of weighing means and it is proposed to employ in this invention weighing means of such continuous weighing type, for example, a flexure type of weighing means which may be of leaf spring configuration or a load cell having a strain gauge as of the resistance type aforementioned.

In the form of the invention of FIG. 10, a load cell 108 having a resistance type strain gauge is shown supporting the bag chair and will be described hereinafter.

With the employment of a rapid responding type of weighing device, it is possible to provide a back weighing packer of considerable speed and sensitivity. In lieu of the aforementioned resistance type strain gauge 108, a continuous weighing scale of the Toledo dial scale type (not shown) can be employed which will enable a bag filling and weighing device quickly to overweigh and return to a correct target weight.

Also the weighing means, such as means 84 of FIG. 8, may comprise the aforementioned flexure type in combination with which there may be employed a pneumatic device for sensing the weight of the bag, such as that shown in U.S. Patents 2,860,848 and 2,860,849 granted to Messrs. Weaver and Titchenal. These patents show a flexure type of sensing means for sensing the weight which is of the quick response type. This type of weighing means measures the motion of the flexure and this can be done by the means shown in the aforementioned patents. Alternatively, a resistance type strain gauge can be bonded to the flexure or leaf spring type of weighing means for providing a continuous electronic sensing of the weight and thereby providing a rapid response when venting back to target weight from an overweight condition. In the form shown in FIG. 10, the electric resistance type of strain gauge of load cell 108 is bonded to a column and the column is of deformable or compressible material, such as steel or some suitable metal.

Referring now to FIG. 10, the apparatus shown therein will be described in further detail, this apparatus being broadly designated 109 and including a valve bag packing and weighing machine embracing a packer 110 having a filling spout 111 and suitable means for holding the valve bag thereon, such as the aforementioned inflatable sleeve 112 and/or a bag clamp (not shown).

In communication with the filling spout 111 is a venting conduit 113 analogous to those above described. In the filling spout 111 and venting conduit 113 are respectively the primary and secondary control valves 114 and 115 which perform functions analogous to the valves 79 and 80 of FIG. 8. The vent conduit 114 is connected to suction means 116.

A bag 117 is fitted on the filling spout 111 and rests upon a bag chair 118 which in turn is supported by the aforementioned load cell 108. The resistance strain gauge of such cell is operatively connected to suitable electronic weight-sensing or recording means 119 which govern the following several elements of the valve bag packer:

(1) A feed cutoff valve control means 120;
(2) A bag discharge control means 121, in turn governing a power device 122 for ejecting the bag 117 from the machine after the filling thereof to proper weight and by a thrust upon the bag via a back portion 123 of the bag chair; and
(3) A vent valve actuating means 124.

The operation of the apparatus of FIG. 10 is initiated by, for example, pressing a starter button 125 of a master control device 126, which is also provided with a stop button 127. This in turn, via the weight-sensing and/or recording means 119, opens the theretofore closed primary valve 114, preferably maintaining vent valve 115 closed, and material is fed into the bag 117 from the packer 110.

The load cell 108, being of the continuous weight sensing type, is quickly responsive to the weight of the bag and its contents. The weight sensing and/or recording means 119 before starting is adjusted by suitable means to sense a selected overweight, such as the aforementioned 110 pounds (the target weight being, e.g. 100 pounds) and thereupon via the feed cutoff valve control means 120 actuates the primary valve 114 to shut off the material in response to the sensing of the selected overweight and via the vent valve actuating means 124 then opens the vent valve 115 to accomplish the vent back to the selected target weight.

Following the closure of the vent valve 115 by a preselected time interval, the bag is ejected by means of the power means 122 which are under the influence of the bag discharge control means 121. The bag discharge control means 121 preferably embraces a timer which can commence the measure of such time delay either with the instant of the cutoff of the main feed by closure of the valve 114 or at the instant of the shutoff of the vent valve 115. Alternatively, the interval of delay can commence at the instant the target weight is sensed by the weight sensing and/or recording means 119.

Referring now to FIGS. 11, 11a and 12, there will now be described a filling spout especially advantageous for employment with the present invention and which embraces a duck bill type of closure device mounted at the end thereof, the filling spout being referred to as of the duck bill type by virtue of its similarity in shape to the bill of the species referred to.

In FIG. 11 there is provided a filling spout generally designated 128 and including a tubular member 129 to the righthand extremity of which are secured a pair of duck bills 130 and 131 (upper and lower), these being hingedly secured so that they can assume the closed position in FIG. 11 or the open position shown in FIG. 12. A perspective view of the duck bill filling spout in a closed condition is shown in FIG. 11a.

Surrounding the duck bills 130 and 131 is an elastic sleeve 132 of rubber or rubber-like material which in one form is capable of resiliently urging closed the duck bills 130 and 131 in the condition shown in FIG. 11a, although this form of the invention is not limited to the latter feature, it being possible to employ a resilient wall interconnection along the adjacent upper and lower edges of the bills which do not necessarily urge the bills towards a closed condition but rather bulge outwardly and sideways when the bills are urged closed by suitable mechanical means. Suitable mechanical means (not shown) are provided for both opening and closing the duck bills of both forms aforementioned.

A valve bag 133 is shown in FIGS. 11 and 12 into the valve of which is inserted the filling spout 128. In the filling of a valve bag, such as 133, by this type of filling spout, it has been found in the past that if the duck bill is closed prior to a satisfactory dissipation of pressure within the bag, there occurs a blowback or a flowback of the powdered material within the top region of the bag, this being dust-laden air, onto the spout so that both the top and the bottom of the spout (or at least the bills thereof) are soiled and become laden with the dusty or powdered material thereby soiling the interior of the valve and defeating the objectives of the invention having to do with production of a clean valve. When the bag is discharged there will be caused both a soiled bag valve interior and a soiled filling spout.

This can be avoided by delaying the closing of the duck bills until there has been a satisfactory pressure dissipation, say from $P_1$ down to $P_2$, assuming the latter to be the pressure at which there will be no blowback of the dusty material within the bag to soil the filling spout.

Once such dissipation has occurred then the bag can be discharged and if, for example, the duck bill type of filling spout is employed in the embodiment of FIG. 9 or 10, it can supplant the secondary or vent back valve, such as 37 or 115. Thus if the duck bill filling spout is used in the environment of the embodiment of FIG. 9 or 10, the control means for the secondary or vent conduit valve 115 are operatively connected to the duck bills to control the opening and closing thereof.

The duck bill type of filling spout can be used with any of the types of feed cutoff valves heretofore described wherein the venting of the top of the bag is accomplished via the filling tube. Any suitable valve device may be employed so long as the venting of the bag takes place back via the filling tube although such venting via this path comprises only one of the paths whereby venting of the bag can take place. Some venting occurs via the material of the bag, such as kraft paper. Alternatively, a venting of the bag can be accomplished via a second valve (not shown) as via a pressure probe which extends through the closed lips of the duck bill filling spout or around such lips.

However, the duck bill type of filling spout of FIGS. 11, 11a and 12 can be employed with any type of valve means which permits the venting of the bag through the filling tube.

Under certain circumstances in filling a valve bag there are instances where it may be desired to maintain a high level of material in the bag up to the top thereof, or at least above the level of the lowermost duck bill. In the latter instances it would not be desirable to vent back via the filling spout because this would reduce the level of material in the bag undesirably. However, in other circumstances there may be no concern with maintaining a selected level of material at the top of the bag and in the case of some divided materials it is not possible to fill a valve bag up to the top and hence there is no reason to refrain from exerting a suction in the top region of the bag via the filling tube to vent back to weight as from an overweight condition. This incidentally aids in cleaning out the filling spout by the suction which occurs in a reverse direction to the flow of material during bag filling.

However, where such duck bills are employed, there need be no concern about cleaning out the interior of the duck bills because there will be no fall-out therefrom of divided material after it has been closed. This is the principal feature of the duck bill type of construction, namely, that there is no dribble out or fall-out of divided material from the end thereof once it is closed.

In operation of the filling spout 128 in conjunction with, for example, the apparatus of FIGS. 9 and 10, assume as before, by way of example, that the ultimate target weight of the bag and its contents is 100 pounds and it is desired to employ the technique of venting back to weight from an overweight condition. Hence, it may be desired to fill the bag to a weight of 110 pounds and remove 10 pounds by suction, thereby to reach the target weight whereupon the duck bill filling spout is closed. In the case of the duck bill type of spout, it is desired in order to achieve the objects of the invention, to maintain the outer surfaces, including the upper and lower surfaces of the spout, in a clean condition. Hence, before closing the duck bills, it is necessary to wait for the dissipation of the pressure in the bag to the aforementioned $P_2$ pressure. Consequently, by the time there has been removed the requisite increment of overweight, namely, 10 pounds, it should be assured that the pressure in the bag has reduced to the lower value, namely $P_2$. If the bag has been filled to overweight sufficiently, say to 110 pounds, such pressure dissipation no doubt will have been accomplished by the time the weight is reduced to the target weight of 100 pounds. However, if the degree of filling to overweight is by a smaller margin, say to 102 pounds, by the time there has been removed merely 2 pounds, thereby reducing to the target weight, the pressure in the bag may have failed to have reached the lowermost desired pressure $P_2$. Hence there will have been a failure to achieve a satisfactory pressure dissipation, and if the duck bills are closed under these conditions and then the bag is discharged, a dust-laden blowback from the bag valve will occur and soil the bag valve, the bag itself and the environment.

It should be borne in mind that when the bag is filled with certain types of large non-dusty granular or pelletized materials, including granular silica gel by way of example, there is normally no soiling of the top and bottom of the filling spout by virtue of a failure to reach a satisfactory pressure dissipation in the bag as down to the pressure $P_2$. In filling such latter types of granular material, it is possible to discharge the bag almost instantaneously on reaching the selected weight and without waiting for pressure dissipation whereupon there will be no dusting or blowback of a disadvantageous kind. With types of granular material such as this, there is often a very fast dissipation of pressure in or via the bag itself because such material does not inhibit the passage of air out through the several pressure dissipation paths, including the paper of the bag, the filling spout, or any other path, such as a probe. Hence, the problem of such pressure dissipation in the bag is minimized with this type of material.

Consequently, the present invention is particularly advantageous for the packing of powdered materials other than such granular materials of the last paragraph, although not necessarily limited to such powdered materials.

Referring to FIG. 13, there is shown a type of filling spout which may be employed in another form of the present invention and which is generally designated 134 and which is of conventional tubular configuration having a cylindrical portion 135 and a tapered extremity 136 having formed therebeneath the mouth of the tube 137. For controlling the flow of material through the tube 135, there are employed a pair of inflatable bladders 138 and 139 which are under the influence of suitable source of air under pressure. The inflatable bladders 138 and 139, when deflated, are flat and lie close against the interior surface of the filling spout so as to provide as small an obstruction as possible to the passage of the divided material therethrough.

FIGS. 14 and 15 show alternative forms of spouts of the plug type which also may be employed in the present invention.

The spout of FIG. 14 is designated 140 and embraces a tube 141 and a fixed extremity 142 which is so held by means of at least one pair of hollow tubes 143 and 144 to which the tip 142 is secured rigidly. The tube 141 has a mouth 145 through which material escapes into a bag and this mouth, in the form shown, is opened and closed by an axially shiftable cover or plug 146 which is under the influence of a fluid-actuated piston 147 within a cylindrical chamber 148. The piston 147 is connected to the plug 146 by a piston rod 149. Fluid, such as air under pressure, it directed to the opposite extremities of the cylindrical chamber 148 via paths within the tubes 143 and 144 as shown, thereby to actuate the cover 146 to open or close the filling tube.

The form of the filling tube shown in FIG. 15 is generally designated 150 and embraces a tube 151 and an axially shiftable plug or end cap 152 which is reciprocable horizontally, as viewed in this figure, by means of a rod 153 which, at its righthand extremity, is secured to the end cap 152 and the lefthand extremity of which extends through the tube 151 and thence to a suitable reciprocable power means (not shown) for shifting such end cap. If desired, parallel rods 154 may be secured parallel to the central rod 153 but positioned radially outwardly therefrom thereby to coact, e.g. with the inner surface of tube 151 to hold the end cap 152 centered with respect to such tube.

Referring now to the form of the invention shown in FIG. 16, there is shown a fluidizing type of packer generally designated 155 which is of the batch pressurized type, that is, it is capable of feeding under pressure successive batches of divided material in fluidized condition into a valve bag, such as 156, via a filling spout 157. In communication with the filling spout 157 is a vent conduit 158 operatively connected with a motor driven suction or blower pump 159, the exhaust of which is directed, as schematically indicated at 160, into a suitable receptacle such as back into the bin 161 of the packer 155 and via the top of such bin.

The type of filling spout 157 is, in this form, preferably similar to that shown in FIGS. 11 and 11a and embraces duck bills 162 and 163 which are surrounded by an elastic sleeve 164.

At the point of interconnection of the vent conduit 158 with the filling spout 157, there is employed a valve 165 which is of the type similar to the rotary cutoff valve 40 of FIG. 3.

There is schematically indicated at 166 a valve, for example, of the butterfly type, for closing a conduit 167 from a storage bin which directs divided material into the main bin 161 periodically under the influence of the valve 166.

While the bin 161 is normally under superatmospheric air pressure in its operation as an element of the pressurized fluidizing type of packer, this air pressure is severely and abruptly reduced for the purpose of stopping the feed of material through the filling spout or tube 157 by placing the bin 161 in communication either with a vacuum chamber 168, or with the atmosphere, this being accomplished via a conduit 169 having therein a control valve 170 which can accomplish the above.

The embodiment of FIG. 16 operates with the following advantages: The need for the usual type of filling or feed cutoff device is eliminated and it is possible to stop the feed of material as aforementioned by venting the bin either to the atmosphere or to the vacuum chamber and thus the feed into the bag 156 is immediately stopped. At this point there is usually some pressure remaining in the bag. There is between (a) the instant of feed cessation, and (b) the next operation, a time delay, wherein the pressure in the bag dissipates to a selected desired value, for example, to the same value as in the bin. That is, the pressure will dissipate to atmospheric or to lower pressure and at the latter instant the duck bills are preferably closed.

Thereafter the bag is discharged, as by the means shown in, for example, the embodiments of FIGS. 8, 9 or 10.

However, it is not necessary to dissipate the pressure in the bag down to atmospheric, this being normally an excessive reduction and not required. It is, however, suggested to dissipate to some lesser extent, for example, 70% or 80% of such amount and in fact somewhere in the neighborhood of 17 inches of water which is above atmospheric pressure. At this point, the duck bills can be closed and the bag discharged, although there may be some residual small pressure in the bag. But such pressure has reached a value which will prevent a disadvantageous blowback of dust-laden air. Thus it is possible to wait for the pressure to dissipate to a point where it will not blow back to an appreciable extent to soil the interior of the valve or the environment and this can be slightly above atmospheric pressure.

Thus in relation to the pressurized batch type of fluidizing packer wherein the feed of material is stopped by the aforementioned venting to a vacuum chamber or to atmosphere, it is possible to close the duck bills at the pressure of, for example, 17 inches of water or some suitable superatmospheric value but near atmospheric and then discharge the bag and this despite the failure of pressures to equalize in the bag and in the bin.

Reverting again to the duck bill type of filling spout shown in FIGS. 11, 11a and 12, the following further advantages of the use of this type of filling spout with the stretchable elastic sleeve around it are gained: A conventional-shaped filling spout, such as that shown in FIGS. 1–4, having a tapered end and having an overhang at the outer extremity with the underside thereof cut away forming the mouth of the filling spout and also having an inflatable sleeve around it to hold the bag valve and the bag on the filling spout has the advantage of fitting tightly against the interior surfaces of the valve and completely preventing their being soiled by the material from the bag. However, it has been found that in packing some types of divided material some residual material may temporarily be stuck under the overhang of the spout near the end of it with respect to certain types of divided material and as the valve bag is discharged. This residuum may fall into an otherwise clean interior surface of the valve of the bag and soil same so that the valve cannot be satisfactorily closed by the use of adhesive or tape or other means. Such disadvantage is eliminated by the use of the aforementioned duck bill type of filling spout and at the same time the advantages of the use of the conventional filling spout with the inflatable sleeve are attained as follows: By the opening of the duck bills they can tightly engage the interior surfaces of the valve as aforementioned and accomplish the same result as the inflatable sleeve in so far as keeping these valve surfaces clean. Furthermore, the closing of the duck bills prevents any dribble or spill out of the end thereof when the valve bag is removed and this by virtue of the absence of any overhang or any portion of the duck bill which is analogous to the overhanging and undercut portion of the conventional type of filling spout wherein the mouth is formed beneath the outer end of the filling spout. Also, the dribble or spill out of the end of the duck bill is prohibited by the tight closure of the end as indicated in FIG. 11a.

In lieu of an expansible sleeve, such as 132 (FIG. 11a) surrounding the duck bills which urges same to a closed condition, there may be employed as aforementioned an elastic wall portion interconnecting the opposite adjacent edges of the duck bills or, alternatively, the duck bills themselves may be made e.g. of rubber or plastic of varying degrees of hardness, the main upper and lower bill portions thereof being of relatively hard rubber or plastic substances and the sidewalls thereof interconnecting the bills of stretchable rubber or plastic or some suitable substance of an elastic nature.

When the duck bill type of filling spout is closed, the sides of it bulge outwardly in those forms wherein such sidewalls may be relatively loosely disposed and therefore bulgable along the adjacent and contacting edges of the bills when the latter are closed. In the form shown in FIG. 11a, the elastic sleeve 132 is relatively tight even when the filling spout is closed in this manner. However, as aforementioned, the portions along the adjacent edges of the opposite bills may bulge slightly outwardly when the duck bill is closed in another form of the invention. Thus in this latter form when the duck bills close or collapse, there is a major spout axis which is horizontal in respect to the cross-section of the duck bills and this is advantageous in that it begins to close and aids in the closing of the valve of the valve bag whether it is of a sewn or pasted type. In the form in FIGS. 11 and 12, the bag valve is of the sewn type.

Reverting to FIG. 13 showing a filling spout having the inflatable bladders therein, as aforementioned the inflation of such bladders will shut off the flow of material therethrough and in a preferred form of this type of filling spout the bladders are conformed so that they will be closed as far as possible outwardly toward the extremity of the filling spout, thereby to inhibit the clinging of material beneath the righthand overhanging portion of the spout as viewed in this figure and particularly on the underside thereof.

Referring to the type of filling spout of FIGS. 1–4, and particularly where there is employed the suction device 47 as in FIGS. 3 and 4, such suction is exerted through the filling spout for cleaning off the under inner surfaces of the valve as the valve bag is being discharged from the spout. This is of substantial advantage in situations where there has been filled into the bag a weight in excess of the target weight, for example, 100¼ pounds, the target weight being 100 pounds. When such an excess weight is filled into the bag, the top of the bag is usually full so that the filling tube also is full. Thus when a suction is exerted upon the bag via the filling tube and there is employed the aforementioned venting back to target weight technique, there is the possibility of retaining some of the material in the filling spout or having it full during the discharge. However, when the bag is discharged, if there is material stuck in the overhanging portion thereof, as viewed in the righthand extremity of these figures, which may soil the undersurfaces of the bag valve as the bag is discharged, the suction through the spout will suck up the lower flap of the valve from its normal position partly into the overhanging portion of the filling tube, that is, partly to the mouth of the filling tube which is beneath the overhanging portion thereof thereby to dislodge such stuck material and to clean off the flap by virtue of the venting or sucking action and this eliminates the disadvantage of the soiled lower surface of the valve.

Thus there are two advantages to this technique involving the lower flap of the bag valve, namely: (a) the cleaning off of the lower paper surfaces of the bag valve because of the higher air velocity in the tube due to restriction of the passage by the lower portion of the bag valve which has been sucked up into the mouth; and (b) the cleaning out of the filling spout so that there is no unwanted divided material in it to give rise to soiling problems during or after bag discharge.

Reference is made to U.S. Patent 2,887,292 granted to O. R. Titchenal, showing a filling spout having therein a collapsible tube of rubber or rubber-like material which tube, in order to shut off the flow of material to the bag, is collapsed by means of a rigid finger which in such patent is shown to be beneath the collapsible tube and is pressed upwardly to collapse it and shut off the feed as aforementioned.

In another form of the present invention and non-analogous to the embodiments heretofore described, there is employed the apparatus shown and described in the aforementioned Titchenal Patent 2,887,292 but with the rigid finger, designated 16 therein, made hollow and preferably enlarged in cross-section so as to provide a clear and large air path for exerting a suction within the bag. An inflatable sleeve surrounding the spout may or may not be employed as desired.

Thus the aforementioned rigid finger or collapsing member 16 of such patent can operate in a manner somewhat analogous to the venting conduit of the embodiments of this invention heretofore described in so far as the venting of the top of the bag is concerned and also in so far as sucking or venting material out of the bag, either with or without an appreciable reduction in weight of material in the bag.

Thus in such collapsible tube form of the invention having the hollow rigid finger which acts as a vent, it is possible by collapsing such collapsible tube to perform the function of the primary cutoff valve above described, thereby to shut off the feed of material to the bag. Also by means of the hollow rigid finger it is possible to vent the bag, that is, to reduce the pressure of the dust-laden air in the bag with or without the exertion of suction upon the interior of the bag via such hollow rigid finger or sleeve collapsing member 16. Preferably such hollow rigid finger is in communication with a suitable vent conduit in which there can be interposed a suitable vent valve analogous to those above described and controlled similarly. For example, such latter vent valve can be controlled in response to the reaching of a selected pressure within the bag in the manner above described thereby to terminate the action of a suction exerted in the bag via such hollow finger and preparing the bag for discharge whereupon the bag can be promptly discharged or discharged following a selected time delay. The deflation of the inflatable sleeve, if employed, is coordinated with bag discharge in any one of the manners heretofore described.

Such rigid hollow tube thus can be employed for the venting of the bag after the filling tube has been collapsed and the feed shut off, thereby removing a selected increment of weight of material from the bag, the latter having been filled to overweight condition, thereby employing the vent back to target weight technique above described. However, this form of the invention is not limited to back venting of the bag to a selected target weight and from an overweight condition but also embraces merely the back venting without the removal of an appreciable weight of material therefrom.

FIG. 19 contains graphical representation as follows:

(a) Pressure variations within three representative bags while they are being filled and up to the point of bag discharge, such pressure variations being plotted against time, such changes being represented by the curves 180, 181 and 182;

(b) Changes in weight of material within the same bags during the same period aforementioned, this being shown by curves 183, 184 and 185 which respectively relate to curves 180, 181 and 182;

(c) Changes in mass flow rate into the same bags with time, that is during the period of the bag filling and up to the point of feed cutoff, this being represented by curve 186 and to several terminal portions; and (d) Changes in the mass flow rate of the material out of the same bags after the instant of feed cutoff, these being shown by curves 187, 188 and 189.

It will be noted that there are three curves in the group 180, 181 and 182 these representing conditions within three separate bags filled at separate times but indicating the differing pressures existing under the conditions related to such bag filling and bearing in mind the types of material and other conditions related to the bag filling cycle.

Also there are the three curves in the group 183, 184 and 185, these representing changes in weight as aforementioned and showing weight changes in the bags whose pressures are respectively plotted by the curves 180, 181 and 182.

The instant of feed cutoff into the bag is represented by the line 190, and the instant of bag discharge by line 191. At the same time of the feed cutoff represented by the line 190, the flow of material into the bag ceases and immediately following this (in those apparatus where the valve and cutoff devices of the present invention are employed and also in those cases where the filling tube is disengaged from the filling orifice and brought out of register with it for venting) the bag is in a position for venting either back to an atmospheric pressure or to a subatmospheric pressure. Consequently the portions of the curves 180, 181 and 182 which are to the right of the line 190 represent the pressures in the bags as they diminish due to the venting thereof.

By the portion of each curve 183, 184 and 185 to the right of the line 190 as viewed in FIG. 19 there is represented the pounds of material after feed cutoff which are expelled from each of the bags due to such venting to atmospheric pressure or to a subatmospheric pressure. As the term "venting" is employed herein, it is normally used in connection with placing the bag in communication with atmospheric pressure. However, for purposes of clarity, the expression "venting" should be considered sufficiently broad to embrace venting to any pressure which is substantially less than the pressure in the bag except where the expressions are made more definite by stating, for example, "venting to atmospheric pressure" or "venting to subatmospheric pressure," it being understood, of course, that the latter embraces venting to a vacuum.

It should be noted that the curves 187, 188 and 189 represent mass flow rate out of a bag both where there is venting to atmospheric and also venting to subatmospheric pressure.

Referring to curves 180, 181 and 182, it will be noted that with respect to the curve 183 indicating the largest number of pounds in a bag in the same time period, the pressure 180 in this same bag is higher than a bag of corresponding size but with a lesser number of pounds of material in it at the time of cutoff.

Compare, for example, the weight of material in a bag represented by the curve 185 at the point of cutoff 185a and the pressure in the same bag as represented by the curve 182 also at the point of feed cutoff 182a.

The fact that the single bag represented by the curves 185 and 182 has less pressure and less weight of material in it at the time of cutoff demonstrates that it has relatively less pumping power to expel material out of the bag as compared to the bag whose curves are 183 and 180 respectively for weight and pressure. The mass flow rate of the material out of the bag (curves 187, 188 and 189) is high commencing at the instant of cutoff as represented by the steep portion of such curves immediately following point 190a. However, it will be noted that curve 187 shows a greater mass flow rate out of the bag (with respect to the bag of curve 183) than curve 189 (for the bag of curve 185). That is, the peak or maximum value of the curve 187 is greater than that of curve 189 for reasons above mentioned. The mass flow rate of material out of the bag diminishes rapidly in proportion to the speed of the pressure in the bag returning to atmospheric value. This condition (by virtue of the fact that the bags with larger amounts of material are at higher pressures and bags with smaller amounts of material are at lower pressures) is self-compensating with respect to the final target weight in that the condition tends to correct for overfilling by expelling more material and tends to correct for underfilling by expelling less material. This is the basis for one of the advantages of packers embodying the present invention and is represented in FIG. 19 by a range of weight deviations shown by the value 192, as compared with a range of weight deviation shown by the line 193 for packers embodying the prior art.

That is, by employing apparatus embodying the present invention the range of weight deviation from a target weight is diminished as compared to such range of weight deviation from a target weight attained by packers of the prior art. The range of deviation of the bag weights from the target weight (e.g. 100 lbs.) after the expelling of material is less than the range of bag weight deviation from such target weight at the time of feed cutoff, this by virtue of employment of the present invention.

Prior to the advent of the present invention, and in particular prior to the cutoff valve means thereof (which can be employed either with venting to atmospheric pressure without employment of a subatmospheric pressure collection system, or it alternatively can be employed with a very light subatmospheric pressure collection system) it was necessary to employ devices which placed the filling tube after feed cutoff in a high velocity negative pressure system to vent the bag and to prevent dust from being expelled into the atmosphere and around the apparatus. This condition resulted in pressure curves prior to the line 190 (the time of feed cutoff) which are substantially identical to those which are obtained due to the employment of the present invention, that is, due to employing the cutoff valve means of this invention. Such pressure curves after the instant of feed cutoff may be quite similar to those experienced in the present invention and as shown in FIG. 19 after line 190, except that the employment of a higher vacuum will increase the slope of such curves, for example, as shown by the portion 180a to the right of such line 190. In addition to this, the employment of such high velocity vacuum or high degree of vacuum will reduce the final pressure of the bag to a negative value, that is, below atmospheric pressure. Because of this latter feature, the expelling of material out of the bag after feed cutoff will continue as long as the bag is subjected to the negative pressure in the dust collection system, or until the level of material in the bag reaches such a point that the negative pressure system is ineffective in pulling additional material out of the bag.

We have established that it is normal for apparatus embodying the present inventions, such as the cutoff valve means herein described, to cause the expulsion of material from the bag, such as cement to approximately 4 to 6 pounds, while employing only atmospheric pressure as the lower pressure. We have also established that it is possible to withdraw as much as 10 to 12 pounds out of a bag by the use of a high vacuum system. Therefore, if on a prior art apparatus such as one employing a delay between feed cutoff and bag discharge and wherein a portion of the filling tube is moved out of register with a stationary portion thereof for purposes of venting, the time delay prior to bag discharge is established or set at a point in excess of that which would be required to bring the bag to proper weight, it is clear that the bag would be subjected to vacuum to such degree that the weight would be lowered to an underweight condition.

As a result, the above-described self-compensating feature of the apparatus employing the valve means of this invention which vents back either to atmosphere or to a very light vacuum, means that the present invention has advantages over and above those now attainable by prior art devices of this character as demonstrated by a comparison of the weight deviation ranges 192 and 193.

Reference is also made to the points 194, 195 and 196 respectively in the curves 183, 184 and 185 and which points are respectively vertically above the points 194a, 195a and 196a of their pressure curve counterparts below (namely, curves 180, 181 and 182 respectively). Such points 194, 195 and 196 represent the points at which the weight change in the bag in each instance ceases, and thereby represents the final weight in the bag due to venting back to atmospheric pressure or a light negative pressure. However, in those instances where the valve construction of the present invention is used in connection with venting back to target weight signal from an overweight condition, the point 195 represents a theoretical correct weight, in this instance 100 lbs. as the weight of the charge; the point 196 represents a weight which has been reduced to a value below the correct target weight, e.g. 99 lbs., but the point 196a represents the weight at which the venting would have been stopped due to such weight signal, thereby correcting this weight. Point 194, however, indicates a weight above the correct target value and therefore this could not have been corrected unless the bag is subjected to a vacuum which would then bring this down to a correct value 194b.

Referring now to curve 197, which is a continuation of curve 180 but is located to the right of the cutoff line 190, this is a graphical representation of the drop in pressure within a bag in a case where there is no venting whatsoever following cutoff, for example, where there is employed a closable tube such as a pinch tube in the filling spout which may be pinched shut whereupon a pressure drop occurs, the slope of which is substantially less than the slopes of the other curves comprising portions of 180, 181 and 182 to the right of such cutoff line 190, the latter curve showing a prompt venting following cutoff. The prompt venting following cutoff is considered to be one of the substantial advantages of the present invention.

Referring now to curve 186, the terminal portion thereof is divided into four branches, the first three of which are designated 186a, 186b and 186c respectively and which are representative of mass flow rates into the bag respectively for the pressure curves 180, 181 and 182.

It is typical, although not necessarily a general rule, that the mass flow rate curves such as 186a, 186b and 186c terminate abruptly at the line 190. Nevertheless, it is entirely possible and sometimes happens that such mass flow rate curve will slope sharply following point 186' down to zero rate as indicated by the terminal branch 186d which represents the condition wherein the back pressure per se within the bag rises to a sufficiently high value to arrest completely the influx of material into the bag prior to the instant of feed cutoff.

What is claimed is:

1. A valve bag packing apparatus having in combination: a bin for receiving divided material, the bin having an outlet in the lower portion thereof; a bag filling tube extending to the outlet in the bin; a venting conduit extending to the aforementioned filling tube, such bin outlet and the venting conduit being connected to a primary valve having a shiftable primary valve plug, such bin outlet being closable and the venting conduit openable by such primary valve plug in a first position, and the mouth of the venting conduit being closable and the bin outlet openable in response to such valve plug being shifted to a second position; a secondary valve positioned in said venting conduit, such secondary valve including a shiftable secondary valve plug; and means for moving said valve plugs, and in response to movement of said plugs to a first joint operating position closing said venting conduit mouth and simultaneously closing said secondary valve, the opening from the bin thus being opened for the flow of material from the bin into a valve bag on the filling tube, and in response to movement of said plugs to a second joint operating position the opening in the bin is closed and the mouth of the venting tube opened and also the secondary valve is opened whereby a filled bag on the filling tube can be vented through the venting conduit.

2. Apparatus in accordance with claim 1 including: an inflatable sleeve surrounding said tube and adapted for being received in a bag valve for inflation to hold the valve on the tube in leak-tight relation; means for coordinating the position of said plugs with the inflation of said sleeve and including means for inflating said sleeve while said bin outlet is closed by said primary valve and means for shifting said valve plugs thereafter to open the bin and close the venting conduit; and means for delaying the deflation of said sleeve a selected time after said plugs have been moved respectively to shut off the feed to the bag and to open said venting conduit.

3. Apparatus in accordance with claim 1 including: an inflatable sleeve surrounding sair tube; means for inflating said sleeve; means for deflating said sleeve; and means for controlling said apparatus: first, to inflate said sleeve while said plugs are in said second joint operating position; second, to maintain said sleeve inflated during bag filling when said plugs are in said first joint operating position; third, for returning said plugs to said second joint operating position in response to a bag on said tube receiving a first preselected weight of material; and fourth, for delaying deflation of said sleeve until a second preselected weight exists in said bag.

4. A valve bag packing apparatus having in combination: a bin for receiving divided material, the bin having an outlet in the lower portion thereof; a filling tube connected to the opening in the bin; a venting conduit having a mouth connected to the aforementioned filling tube, such bin outlet and the mouth of said venting conduit being connected to a primary valve having a shiftable primary valve plug, such bin outlet being closable and the mouth of the venting conduit openable by such primary valve plug in a first position, and the mouth of the venting conduit being closable and the bin outlet openable in response to such valve plug being shifted to a second position; a secondary valve connected in said venting conduit, such secondary valve including a shiftable secondary valve plug; means for actuating both of said valves respectively to shut off the feed of material to a valve bag on said tube and to open said secondary valve thereby to open said venting conduit in response to said bag and contents reaching a selected weight.

5. Apparatus in accordance with claim 4 including means for closing said secondary valve in response to said bag and contents reaching a second selected weight less than such first weight.

6. A valve bag packing apparatus having in combination: a bin for receiving divided material, the bin having an outlet in the lower portion thereof; a filling spout extending to the opening in the bin; an expandable sleeve surrounding the filling spout; a venting conduit extending to the aforementioned filling spout; a valve having a shiftable valve plug; such bin outlet and venting conduit being connected to said valve and being formed for coaction with said shiftable valve plug of such valve, such bin outlet being closable and said venting conduit openable by such valve plug in a first position, and the mouth of the venting conduit being closable and the bin outlet openable in response to such valve plug being shifted to a second position; means for shifting said valve plug whereby the opening in the bin is closed and the mouth of the venting tube opened and a filled bag on the filling tube can be vented through the venting conduit; separate means for closing said venting conduit; means for expanding and contracting said sleeve; and means for actuating said last two-named means in timed relation.

7. A valve bag filling machine having a filling spout adapted for introduction into a valve of a bag, and means for feeding material through such spout into a bag, characterized by the fact that said spout is provided with a pair of bills mounted thereon conformed for opening and closing the end of the spout, said bills being formed with a relatively flat cross-section near the ends thereof to be loosely received in a bag valve having a somewhat flattened cross-section, an elastic sleeve surrounding said spout bills, and means for expanding and opening said bills when in a bag valve and for collapsing and closing same when the spout is to be withdrawn from the bag valve.

8. In a machine for filling valve bags and weighing the contents during filling, the combination comprising: a hopper for divided material; a filling spout connected thereto and adapted to be introduced into a bag valve; means for forcing material from said hopper through the spout into the bag; shut-off gate means for said spout; supporting means for the bag; weighing means operatively connected to said supporting means; an expansible sleeve surrounding a portion of the spout within the bag valve; means for expanding said sleeve in timed relation with the opening of said gate means, and means automatically actuatable in response to such weighing means sensing a selected first weight to close said gate means, and means for collapsing said sleeve in response to such weighing means sensing a second selected weight.

9. In a machine for filling valve bags with divided material from a hopper, the combination comprising: a filling spout in communication with such hopper, such spout being formed with a rigid upper portion for supporting a bag and a flexible under portion adapted to be collapsed against such upper portion for shutting off the flow of such material therethrough; a rigid tubular member mounted along said flexible under portion for collapsing the latter in response to relative movement of such spout and member; and means for controlling the relative movement of said spout and rigid tubular member for collapsing said flexible portion thereby to shut off the flow of material, said control means also being adapted for effecting a reverse relative movement to open said spout.

10. Machine in accordance with claim 9 including means for discharging the bag from the spout in response to the occurence of a selected pressure in the bag sensed via such tubular member.

11. A valve bag filling machine having a filling spout adapted for introduction into the valve of a valve bag, means for feeding divided material through such spout into such a bag thereon including a liner tube for such spout of resilient material, a rigid hollow tubular member mounted along and beneath said resilient liner tube, mounting means for said spout and tubular member for supporting same for relative angular movement within preselected angular limits, said liner tube at one relative position being open for the passage of divided material therethrough and in another relative angular position thereof being closed as a result of the relative angular movement of the spout and said rigid member, means for holding said spout and tubular member in said first-mentioned relative angular position, and means responsive to receipt of a preselected weight of material in a bag upon such spout to change said spout and member to such second position thereby to shut off the flow of material to the bag, said bag being vented thereafter via such tubular member and prior to discharge of the bag, and means for discharging said bag after such venting.

12. A valve bag filling machine having a filling spout adapted for introduction into the valve of a valve bag, means for feeding material through such spout into a bag thereon, shut-off gate means for controlling such feeding including a flexible liner tube for such filling spout which liner tube is of resilient material, said filling spout being of rigid material and a substantial portion of the length thereof being in the form of an inverted trough, thereby exposing on the underside thereof a substantial length of said liner tube, the upper portion of the latter being in engagement with the under surface of said inverted trough portion of the spout, the latter thereby being adapted for the supporting of a valve bag into the valve of which it is inserted, a hollow tubular liner collapsing element mounted along and adjacent said liner tube, at least a portion of which element is located near the outer end of said liner tube, means for effecting relative movement of said liner tube and collapsing element, such collapsing element comprising a vent conduit for venting a bag, valve means for such vent conduit, and means for shutting such valve means in response to the receipt in a bag of a selected weight of material.

(References on following page)

References Cited in the file of this patent

UNITED STATES PATENTS

| | | | |
|---|---|---|---|
| 870,215 | Bates | Nov. 5, | 1907 |
| 1,088,633 | Simmons et al. | Feb. 24, | 1914 |
| 2,192,982 | Meendsen | Mar. 12, | 1940 |
| 2,248,877 | Knudsen | July 8, | 1941 |
| 2,251,659 | Bushman | Aug. 5, | 1941 |
| 2,733,848 | Bos Houwers | Feb. 7, | 1956 |
| 2,781,799 | Bradford | Feb. 19, | 1957 |
| 2,799,465 | Carter | July 16, | 1957 |
| 2,866,484 | Rose | Dec. 30, | 1958 |
| 2,887,292 | Titchenal | May 19, | 1959 |
| 2,955,796 | Titchenal | Oct. 11, | 1960 |

FOREIGN PATENTS

| | | | |
|---|---|---|---|
| 648,312 | Great Britain | Jan. 3, | 1951 |

UNITED STATES PATENT OFFICE
CERTIFICATE OF CORRECTION

Patent No. 3,072,208                      January 8, 1963

Oliver R. Titchenal et al.

It is hereby certified that error appears in the above numbered patent requiring correction and that the said Letters Patent should read as corrected below.

Column 1, line 40, for "bring" read -- bringing --; column 2, line 50, for "be" read -- the --; column 10, lines 40 and 41, for "ontrolled" read -- controlled --; column 12, line 31, for "Conitnuous" read -- Continuous --; column 13, line 5, for "114" read -- 113 --; column 16, line 10, for "it" read -- is --; column 20, line 6, strike out "same"; column 23, line 7, for "sair" read -- said --; column 24, line 30, for "occurence" read -- occurrence --.

Signed and sealed this 22nd day of October 1963.

(SEAL)
Attest:

ERNEST W. SWIDER
Attesting Officer

EDWIN L. REYNOLDS
Acting Commissioner of Patents